(12) United States Patent
Takata et al.

(10) Patent No.: US 7,535,499 B2
(45) Date of Patent: *May 19, 2009

(54) PANORAMA IMAGE SYNTHESIS METHOD, OBJECT DETECTION METHOD, PANORAMA IMAGE SYNTHESIS SYSTEM, IMAGE SHOOTING APPARATUS, AND PANORAMA IMAGE SYNTHESIS PROGRAM

(75) Inventors: Kazutoyo Takata, Neyagawa (JP); Kunio Nobori, Kadoma (JP); Satoshi Sato, Neyagawa (JP)

(73) Assignee: Panasonic Corporation, Osaka (JP)

( * ) Notice: Subject to any disclaimer, the term of this patent is extended or adjusted under 35 U.S.C. 154(b) by 576 days.

This patent is subject to a terminal disclaimer.

(21) Appl. No.: 11/132,654

(22) Filed: May 19, 2005

(65) Prior Publication Data

US 2006/0023090 A1    Feb. 2, 2006

Related U.S. Application Data

(63) Continuation of application No. PCT/JP2005/01829, filed on Feb. 8, 2005.

(30) Foreign Application Priority Data

Jul. 28, 2004   (JP) .............................. 2004-220719

(51) Int. Cl.
*H04N 5/262*   (2006.01)
*H04N 5/225*   (2006.01)
*G06K 9/34*    (2006.01)

(52) U.S. Cl. .................... 348/239; 348/218.1; 382/173; 382/164

(58) Field of Classification Search ................. 348/239, 348/207.99, 36, 37, 218.1, 50, 294, 293; 382/294, 173, 164
See application file for complete search history.

(56) References Cited

U.S. PATENT DOCUMENTS 5,550,641 A * 8/1996 Shashua et al. ............. 386/128

(Continued)

FOREIGN PATENT DOCUMENTS

JP         07-193746 A      7/1995

(Continued)

OTHER PUBLICATIONS

Shashua, Amnon, "Geometry and Photometry in 3D Visual Recognition", MIT PhD Thesis, chapter 5, section 5.1 (Nov. 1992).*

(Continued)

*Primary Examiner*—Lin Ye
*Assistant Examiner*—Marly Camargo
(74) *Attorney, Agent, or Firm*—Harness, Dickey & Pierce, P.L.C.

(57) ABSTRACT

An overlap image group each having a first overlap region is selected (S11). The overlap image group is composed of N images including a second overlap region other than the first overlap region and a to-be-expanded image not including the second overlap region. A linearization coefficient of the to-be-expanded image is calculated using the images of the overlap image group in the first overlap region (S12), and the to-be-expanded image is expanded in size up to the second overlap region, using the thus calculated linearization coefficient and the N images in the second overlap region (S14). This processing is repeated to generate a panorama image.

16 Claims, 19 Drawing Sheets

U.S. PATENT DOCUMENTS

| | | | |
|---|---|---|---|
| 5,598,515 A * | 1/1997 | Shashua | 345/422 |
| 5,745,636 A * | 4/1998 | Shashua et al. | 386/46 |
| 6,094,198 A * | 7/2000 | Shashua | 345/419 |
| 6,167,151 A * | 12/2000 | Albeck et al. | 382/154 |
| 6,232,977 B1 * | 5/2001 | Chen | 345/419 |
| 6,278,466 B1 * | 8/2001 | Chen | 345/473 |
| 6,549,681 B1 * | 4/2003 | Takiguchi et al. | 382/294 |
| 6,552,744 B2 * | 4/2003 | Chen | 348/218.1 |
| 6,885,776 B2 * | 4/2005 | Takakura et al. | 382/284 |
| 6,978,051 B2 * | 12/2005 | Edwards | 382/284 |
| 7,057,650 B1 * | 6/2006 | Sakamoto | 348/239 |
| 7,123,291 B2 * | 10/2006 | Horie | 348/218.1 |
| 7,203,362 B2 * | 4/2007 | Sato et al. | 382/173 |
| 7,224,387 B2 * | 5/2007 | Boyd | 348/239 |
| 7,236,630 B2 * | 6/2007 | Sato et al. | 382/173 |
| 2003/0002735 A1 * | 1/2003 | Yamamoto et al. | 382/167 |

FOREIGN PATENT DOCUMENTS

| | | |
|---|---|---|
| JP | 09-93430 A | 4/1997 |
| JP | 09-321972 | 12/1997 |
| JP | 11-242737 A | 9/1999 |
| JP | 2002-150264 | 5/2002 |
| JP | 2004-005509 | 1/2004 |
| JP | 2004-139219 A | 5/2004 |

OTHER PUBLICATIONS

Weng et al.; "Computer Vision Technology Review and Future Prospects;" New Technology Communication; pp. 42-44; 1998; and a partial English translation thereof.

Research and Development Report from Natural Vision Reserach & Development Project (Advanced Video Display/Transmission System) 2000; Communication and Broadcast Organization; pp. 51-53; 2001; and a partial English translation thereof.

Shashua A.; "Geometry and Photometry in 3D Visual Recognition"; P.D. Thesis; Dept. Brain and Cognitive Science; MIT; 1992.

"Photometric Linearization based on Classification of Photometric Factors;" Image Recognition/Comprehension Symposium (MIRU2002) Transactions; vol. 2, pp. 167-176; 2002.

"Image Analysis Handbook;" Tokyo University Shuppankai; pp. 463; 1991; and a partial English translation thereof.

MA Fischler et al.; "Random sample consensus: a paradigm for model fitting with application to image analysis and automated cartography;" Commun; Assoc. Comp; pp. 381-395; Mar. 24, 1981.

"Separation of Reflection Components Based on Frequency Characteristics of Bidirectional Reflectance Distribution Functions;" Research Report of Information Processing Society of Japan; CVIM 2002-134-1; pp. 1-8; 2002.

"Numeral Recipes in C Japanese Edition;" Gijutsu-Hyoron Co., Ltd.; pp. 292-295; 1993; and a partial English translation thereof.

\* cited by examiner

FIG.6
pixel value
$i_{1(x_1,y_1)}$
$i_{1(x_2,y_2)}$
$i_{1(x_3,y_3)}$
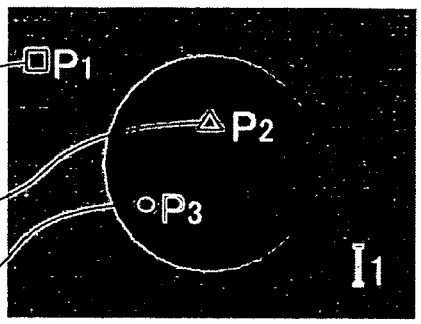
$i_{2(x_1,y_1)}$
$i_{2(x_2,y_2)}$
$i_{2(x_3,y_3)}$
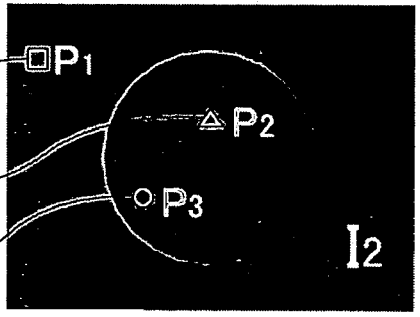
$i_{3(x_1,y_1)}$
$i_{3(x_2,y_2)}$
$i_{3(x_3,y_3)}$
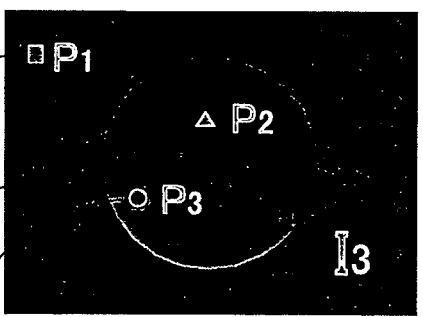
$i_{4(x_1,y_1)}$
$i_{4(x_2,y_2)}$
$i_{4(x_3,y_3)}$
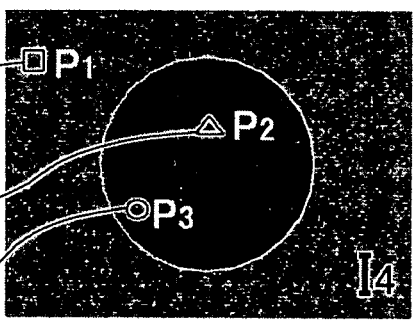
coordinate value
P1 : ($x_1, y_1$)
P2 : ($x_2, y_2$)
P3 : ($x_3, y_3$)

FIG.17

|  | Embodiment 1 | Embodiment 3 |
| --- | --- | --- |
| mean square error of intensity | 0.59 | 0.42 |
| variance of mean square error | 0.53 | 0.38 |

PANORAMA IMAGE SYNTHESIS METHOD, OBJECT DETECTION METHOD, PANORAMA IMAGE SYNTHESIS SYSTEM, IMAGE SHOOTING APPARATUS, AND PANORAMA IMAGE SYNTHESIS PROGRAM

CROSS REFERENCE TO RELATED APPLICATIONS

This is a continuation of Application PCT/JP2005/001829 filed on Feb. 8, 2005.

BACKGROUND OF THE INVENTION

The present invention relates to a technology for synthesizing a generally-called panorama image and a technology for detecting an object from an image using panorama images.

Out of object detection methods using a pan-tilt camera and the like, an effective method is that one large panorama image is synthesized from a plurality of shot images of which shooting directions are different from each other and image processing such as a background subtraction is performed using the thus synthesized panorama image.

As a conventional technique relating to the panorama image synthesis, there is disclosed in Patent Document 1, for example, a panorama image synthesis method including the steps of: obtaining a motion vector from a camera position, a camera posture, and an input image pair by image analysis; calculating a camera parameter based on the motion vector; and jointing images in accordance with the calculated parameter. This method attains accurate alignment among the images and synthesis of a panorama image with less positional distortion.

Patent Document 1: Japanese Patent Application Laid Open Publication No. 2002-105264A

SUMMARY OF THE INVENTION

Problems that the Invention is to Solve

In the above conventional technique, however, when light source environment, such as a position, a direction, an intensity, and the number of light sources varies during shooting of images to be used for panorama image synthesis, a panorama image in which a light source environment is difference from part to part, in other words, a panorama image of which light source environment is not uniform is obtained. A background subtraction using such a panorama image of which light source environment is not uniform causes detection of a background region other than an object as an object, largely lowering the accuracy of the object detection.

Also, when the light source environment varies after panorama image synthesis, the light source environment is largely different between the image to be used for object detection and the panorama image, so that a background region other than an object is detected as an object, lowering the accuracy of the object detection by the background subtraction.

The problems caused due to variation in light source environment are remarkable especially in object detection performed outdoor, for example, and must be solved for application to an actual system.

The present invention has been made in view of the above problems and has its objective of synthesizing a panorama image of which light source environment is uniform over the whole to attain object detection even in the case where the light source environment varies.

Means of Solving the Problems

In order to solve the above problems, the present invention provides a panorama image synthesis method wherein: an overlap image group composed of N images (N is an integer larger than 2) each including a first overlap region and a second overlap region other than the first overlap region and a to-be-expanded image including the first overlap region and not including the second overlap region is obtained; a linearization coefficient of the to-be-expanded image is calculated using pixel values of the respective images of the overlap image group in the first overlap region; the to-be-expanded image is expanded in size to the second overlap region using the calculated linearization coefficient and pixel values of the N images of the overlap image group in the second overlap region; and a panorama image is synthesized based on the to-be-expanded image of which size is expanded.

According to the present invention, the to-be-expanded image can be expanded up to the second overlap region with the use of the linearization coefficient obtained from each image in the first overlap region. In detail, an image under uniform light source environment as that in an arbitrarily selected to-be-expanded image can be expanded to "the to-be-expanded image plus the second overlap region." Hence, a panorama image of which light source environment is uniform over the whole can be generated easily.

Wherein, the term "a panorama image of which light source environment is uniform" in the present invention means a panorama image in which a position, a direction, an intensity and the number of estimated light sources are substantially uniform in each portion of the panorama image. Though it is possible in theory to make the light source environment completely uniform, it is probable in practice that the light source environment is not completely uniform because of a computing error in linearization coefficient calculation and the like. The present invention also takes such a case in consideration.

Further, the present invention provides a method for detecting an object from an image by which an object is detected in such a manner that: a plurality of panorama images each including a shot range of an image under detection are generated by the aforementioned panorama image synthesis method of the present invention; a predicted background image of which light source environment is the same as that in the image under detection is generated based on the image under detection and the plurality of panorama images; and the thus generated predicted background image is compared with the image under detection.

According to this present invention, the predicted background image of which light source environment is uniform is generated for the image under detection with the use of the plurality of panorama images of which light source environment is uniform over the whole. In association therewith, an object can be detected with accuracy from an image of which light source environment is different from that in the panorama images.

Effect of the Invention

According to the present invention, utilization of image linearization leads to synthesis of a panorama image of which light source environment is uniform. Also, with the use of a plurality of panorama images thus obtained, an object can be detected from the image shot under arbitrary light source environment.

BRIEF DESCRIPTION OF THE DRAWINGS

FIG. 6 is a drawing for explaining a process for calculating a linearization coefficient.

FIG. 17 is a table indicating the comparison result between Embodiment 1 and Embodiment 3.

DESCRIPTION OF THE PREFERRED EMBODIMENTS

Figure 1:
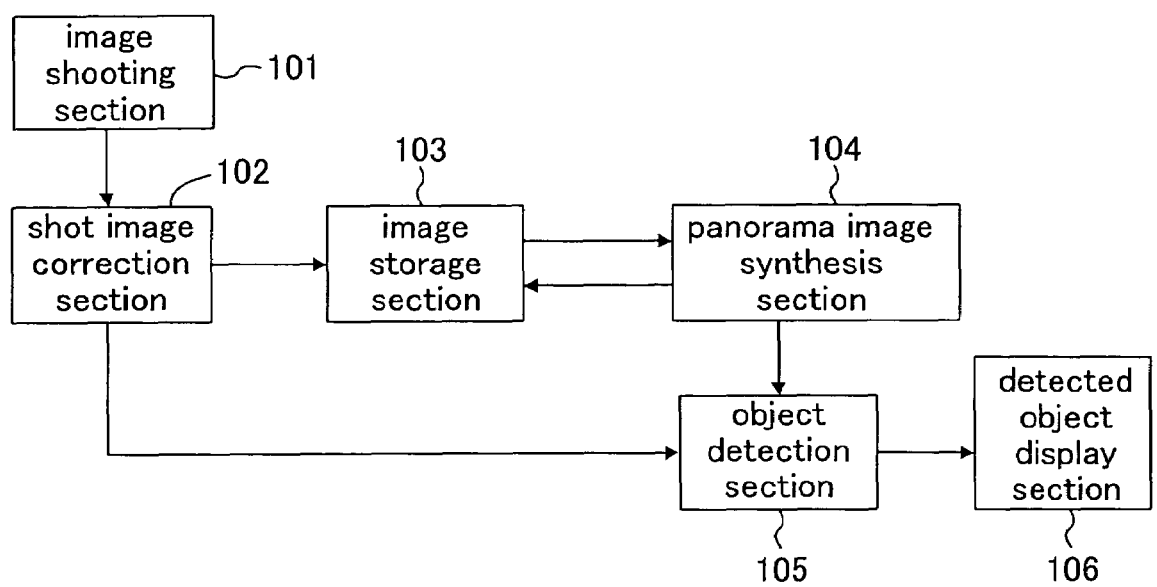
FIG. 1 is a constitutional drawing of an object detection system according to Embodiment 1 of the present invention.

A first aspect of the present invention provides a panorama image synthesis method including the steps of: obtaining an overlap image group of images including a first overlap region in common, the images being composed of N images (N is an integer larger than 2) including a second overlap region other than the first overlap region and a to-be-expanded image not including the second overlap region; calculating a linearization coefficient of the to-be-expanded image, using pixel values of the images of the overlap image group in the first overlap region; and expanding in size the to-be-expanded image up to the second overlap region, using the linearization coefficient and pixel values of the N images in the second overlap region, wherein a panorama image is synthesized based on the to-be-expanded image of which size is expanded.

A second aspect of the present invention provides the panorama image synthesis method of the first aspect, wherein images different from one another in light source environment are obtained as the N images.

A third aspect of the present invention provides the panorama image synthesis method of the first aspect, further including the step of: judging reliability of the calculated linearization coefficient of the to-be-expanded image, wherein when it is judged that the reliability is low, an overlap image group is obtained again.

A fourth aspect of the present invention provides the panorama image synthesis method of the first aspect, wherein in the overlap image group obtaining step, an overlap image group is selected from images stored in an image storage section, and when a new image is input to the image storage section, reselection of an overlap image group is performed, suitability for image synthesis is compared between the newly selected overlap image group and a former overlap image group, and whether the panorama image is to be updated or not is judged based on the comparison result.

A fifth aspect of the present invention provides the panorama image synthesis method of the fourth aspect, wherein the suitability for image synthesis is judged based on a number of diffuse reflection pixels, and the panorama image is updated when the newly selected overlap image group includes a larger number of diffuse reflection pixels than the former overlap image group.

A sixth aspect of the present invention provides the panorama image synthesis method of the fourth aspect, wherein the suitability for image synthesis is judged based on inter-image independency, and the panorama image is updated when the newly selected overlap image group has higher inter-image independency than the former overlap image group.

A seventh aspect of the present invention provides an object detection method including the steps of: generating a plurality of panorama images each including a shot range of an image under detection by the panorama image synthesis method of the first aspect; generating a predicted background image of which light source environment is the same as that of the image under detection based on the image under detection and the plurality of panorama images; and performing object detection by comparing the image under detection and the predicted background image.

An eighth aspect of the present invention provides the object detection method of the seventh aspect, wherein a number of the plurality of panorama images is at least three.

A ninth aspect of the present invention provides the panorama image synthesis method of the first aspect, wherein in the overlap image group obtaining step, when a plurality of overlap image groups each having the same first overlap region are present, reliability of calculated linearization coefficients of the respective overlap image groups are evaluated to select a group with highest reliability.

A tenth aspect of the present invention provides the panorama image synthesis method of the first aspect, further including the step of: judging whether an evaluation image group is present or not for the to-be-extended image, wherein when an evaluation image group is present, the linearization coefficient of the to-be-expanded image is calculated using the evaluation image group.

An eleventh aspect of the present invention provides the panorama image synthesis method of the tenth aspect, wherein when a plurality of evaluation image groups are present, an evaluation image group having highest image independency in the second overlap region included in the evaluation image group is selected.

A twelfth aspect of the present invention provides the panorama image synthesis method of the tenth aspect, wherein when a plurality of evaluation image groups are present, an evaluation image group which occupies an image region with a largest number of pixels is selected.

A thirteenth aspect of the present invention provides a panorama image synthesis system including: means for obtaining an overlap image group of images including a first overlap region in common, the images being composed of N images (N is an integer larger than 2) including a second overlap region other than the first overlap region and a to-be-expanded image not including the second overlap region; means for calculating a linearization coefficient of the to-be-expanded image, using pixel values of the image of the overlap image group in the first overlap region; and means for expanding in size the to-be-expanded image up to the second overlap region, using the liner coefficient and pixel values of the N images in the second overlap region, wherein a panorama image is synthesized based on the to-be-expanded image of which size is expanded.

A fourteenth aspect of the present invention provides an image shooting apparatus including: an image shooting section; a shot image correction section that performs geometric correction and optical correction to an image shot by the image shooting section; an image storage section that stores images corrected by the shot image correction section; and the panorama image synthesis system of the thirteenth aspect that receives an image stored in the image storage section as an input, wherein the panorama synthesis system obtains the overlap image group from the images stored in the image storage system.

A fifteenth aspect of the present invention provides an object detection system including: the image shooting apparatus of the fourteenth aspect; an object detection section that performs object detection using a panorama image synthesized by the panorama image synthesis system included by the image shooting apparatus; and a detected object display section that displays a region of an object detected by the object detection section.

A sixteenth aspect of the present invention provides a panorama image synthesis program that allows a computer to execute panorama image synthesis, including the steps of: obtaining an overlap image group of images including a first overlap region in common, the images being composed of N images (N IS an integer larger than 2) including a second overlap region other than the first overlap region and a to-be-expanded image not including the second overlap region; calculating a linearization coefficient of the to-be-expanded image, using pixel values of the images of the overlap image group in the first overlap region; expanding in size the to-be-expanded image up to the second overlap region, using the linearization coefficient and pixel values of the N images in the second overlap region; and synthesizing a panorama image based on the to-be-expanded image of which size is expanded.

A seventeenth aspect of the present invention provides a panorama image synthesis system, which receives as an input a plurality of partial images which overlap with each other in a part of an image region and which are different from each other in light source environment, and which generates a panorama image over a wider range than each of the partial images and with uniform light source environment based on the input partial images and outputs it.

Embodiments of the present invention will be described below with reference to the drawings.

Embodiment 1

FIG. 1 is a constitutional drawing of an object detection system that employs a panorama image synthesis method according to Embodiment 1 of the present invention. In FIG. 1, a reference numeral 101 denotes an image shooting section that shoots a still image or a motion image; 102 denotes a shot image correction section that performs correction to an image shot by the image shooting section 101; 103 is an image storage section that stores images corrected by the shot image correction section 102; 104 denotes a panorama image synthesis section as a panorama image synthesis system that synthesizes a panorama image from images stored in the image storage section 103; 105 denotes an object detection section that performs object detection using an image shot by the image shooting section 101 and panorama images synthesized by the panorama image synthesis section 104; and 106 denotes a detected object display section that displays an object region detected by the object detection section 105. The image shooting section 101, the shot image correction section 102, the image storage section 103, and the panorama image synthesis section 104 compose an image shooting apparatus of the present invention.

Operation to synthesize a panorama image from a plurality of images different from each other in shooting direction and to perform object detection using synthesized panorama images in the object detection system of FIG. 1 will be described below. The object detection herein means detection of an object reflected in an image other than a background, the image being shot after at least three panorama images of which light source environment is different from one another are synthesized and the thus synthesized images being used as the background.

For the sake of simple explanation, it is premised as environmental conditions that a light source is a parallel light source and the surface of an object serves as a perfectly diffuse reflector.

The image shooting section 101 shoots images of which shooting direction is different from each other. Specifically, for example, the shooting is performed by a video camera or a digital still camera capable of performing pan-tilt (PT) operation or by a video camera or a digital still camera fixed at a pan head capable of performing the PT operation. Herein, a video camera capable of performing the PT operation is used.

Figure 2:
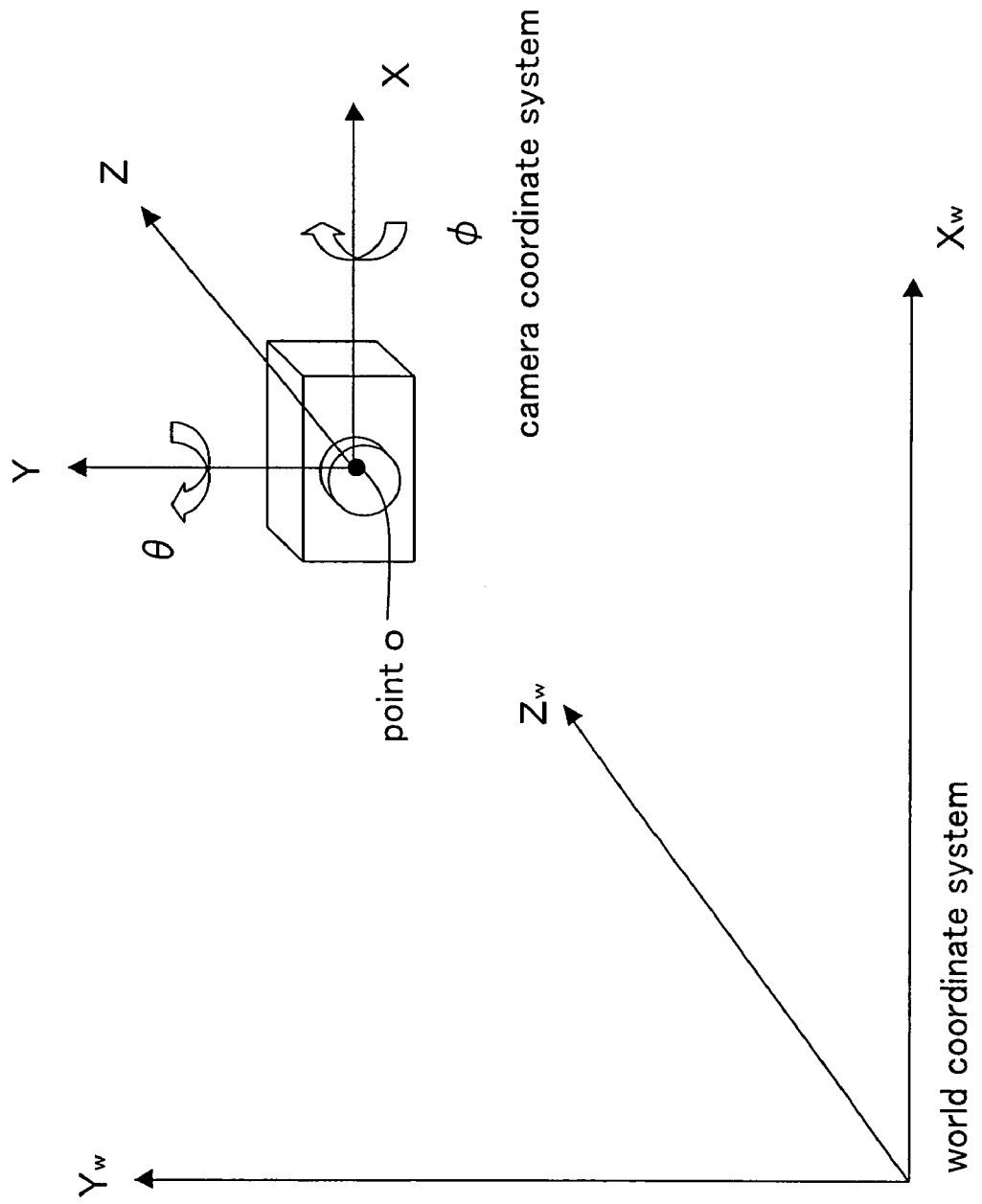
FIG. 2 is a drawing showing a coordinate system that defines a position and a posture of a camera.

The image shooting section 101 sends camera position/posture information to the shot image correction section 102 together with a shot image. The camera position/posture information includes five parameters (Xw, Yw, Zw, θ, φ) indicated in FIG. 2. Xw, Yw, and Zw indicate position coordinates (point o) of the camera in a world coordinate system, and θ and φ indicate angles (pan angle and tilt angle) at which the Y axis and the X axis in the camera coordinate system revolve leftward with respect to the positive direction, respectively. For detecting the position and the posture of the camera, a position detection system such as a GPS, and a posture detection system such as a gyroscope may be used, for example. Alternatively, the position and the posture of the camera may be calculated in advance from a pre-designed shooting plan. The pre-designed shooting plan includes, for example, moving a camera from the initial point ($X_0, Y_0, Z_0, θ_0, φ_0$) in the positive direction of φ in accordance with uniform motion at an angular velocity of 0.1π [rad/sec], and the like.

The shot image correction section 102 performs to the image shot by the image shooting section 101 geometric correction, optical correction and coordinate transformation from the coordinate system of the shot image to a panorama projection plane coordinate system. Correction of lens distortion is performed as the geometric correction of the shot image. A lens distortion correction method by Weng et al. disclosed in "Computer Vision Technology Review and Future Prospects," pp. 42-44, New Technology Communication, 1998, may be employed, for example. Also, correction of limb darkening is performed as the optical correction of the shot image. A method disclosed in "Research and Development Report from Natural Vision Research & Development Project (Advanced Video Display/Transmission System) 2000," pp. 51-53, Communication and Broadcast Organization, 2001, may be employed as the optical correction of the shot image, for example. The disclosed method is that: one point light source with no time variation in intensity is used as an object, a camera is oscillated so that the point light source comes at desired positions, and a correction coefficient of the limb darkening is calculated using reciprocals of intensity values at the observed positions.

Figure 3:
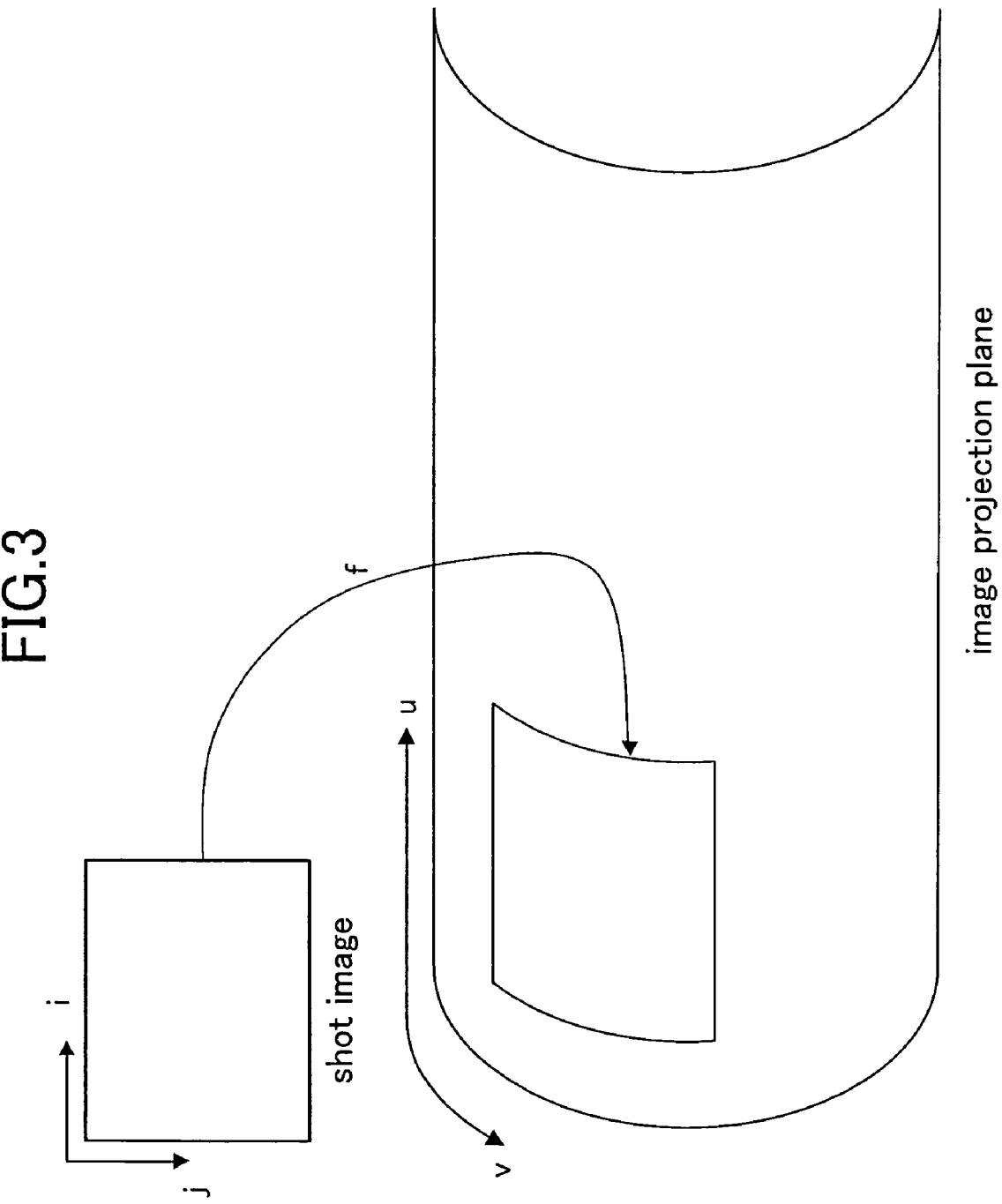
FIG. 3 is a drawing showing a coordinate transformation method to a panorama projection plane coordinate system.

Referring to the coordinate transformation method to the panorama projection plane coordinate system, as illustrated in FIG. 3, for example, a function f, which used is for transforming a coordinate system (i, j) of a shot image to a panorama projection plane coordinate system (u, v) under projection in a cylindrical coordinate system, is expressed by the following expression using the camera position/posture information sent from the image shooting section 101.

$$(u, v) = f(i, j, Xw, Yw, Zw, \theta, \phi) \quad \text{(Expression 1)}$$

It is noted that the transformation from the shot image coordinate system (i, j) to the panorama projection plane coordinate system (u, v) may be performed by projection using a spherical coordinate system. Or, the projection may be performed using a planar coordinate system when pan/tilt angles are small.

Wherein, respective correction parameters used in the aforementioned shot image correction section 102 are obtained in advance before object detection by the present system.

The image storage section 103 stores in a storage medium images subjected to the correction by the shot image correction section 102 and the camera position/posture information. The storage medium is reduced to practice by a memory, a hard disk, film, and the like, for example.

<Panorama Image Synthesis>

The panorama image synthesis section 104 generates a panorama image from a plurality of images stored in the image storage section 103. The operation of the panorama image synthesis section 104 will be described below with reference to the flowchart of FIG. 4.

Figure 5:
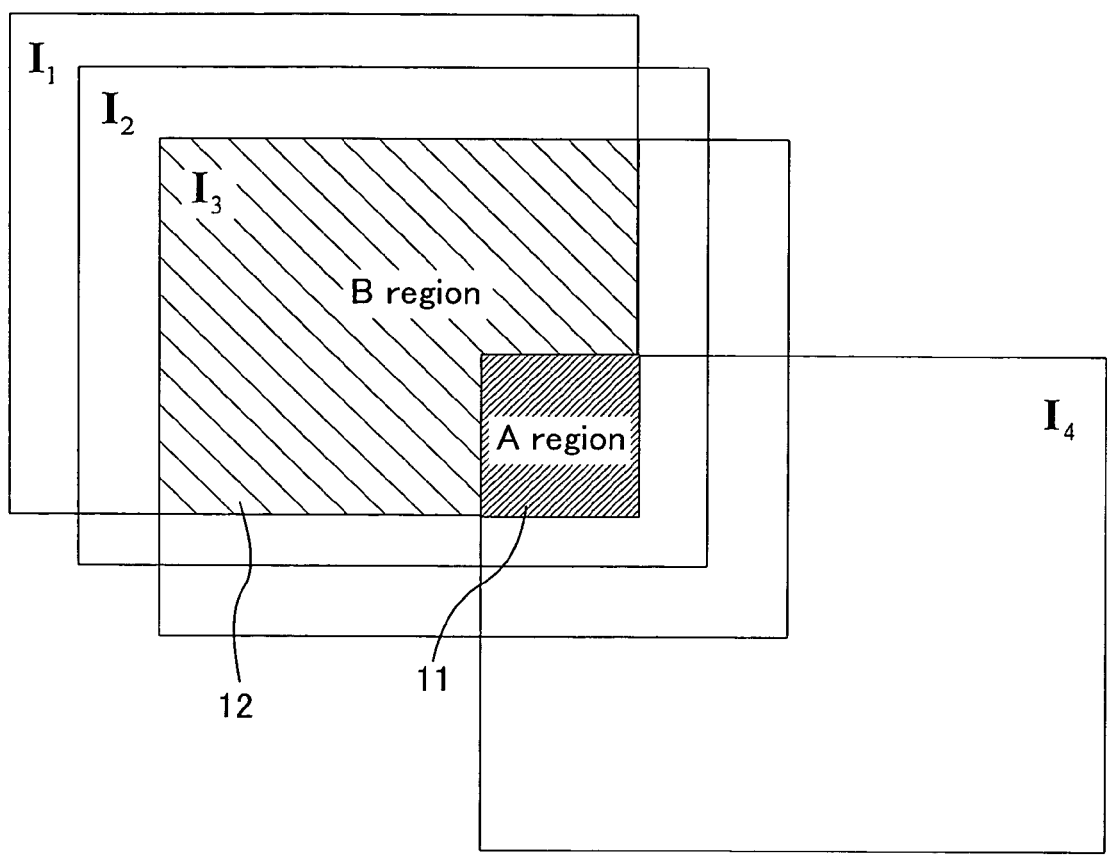
FIG. 5 is a diagram showing one example of a selected overlap image group.

First, in a step S11, an overlap image group composed of N images (N is an integer larger than 2) each including a first overlap region (A region) and a second overlap region (B region) other than the A region and an image as a to-be-expanded image including the A region and not including the B region is selected from images stored in the image storage section 103 (S11). Herein, N is set to be 3. FIG. 5 is a diagram showing an example of the selected overlap image group. In FIG. 5, $I_1$, $I_2$, $I_3$, and $I_4$ are images selected from the image storage section 103 and overlap one another in the A region 11. In the B region 12 other than the A region 11, three images $I_1$, $I_2$, $I_3$ overlap one another while the image $I_4$ excludes the B region 12. The number of overlap images in the A region and the B region will be described later.

For detecting the overlap region in each image, the coordinate value of each image in the panorama projection plane coordinate system (u, v) may be used, for example. Also, when a plurality of overlap image groups are present for a given pixel position, a group having the highest independency among three images including the B region may be selected. The specific method thereof will be described later.

Next, in a step S12, a linearization coefficient to be used for expansion of the to-be-expanded image is calculated using the overlap image group selected in the step S11. The linearization coefficient calculation is performed using pixel values of the respective images of the overlap image group in the A region, based on the method by Shashua (see "Geometry and Photometry in 3D Visual Recognition" by Shashua A., P. D. Thesis, Dept. Brain and Cognitive Science, MIT, 1992).

The linearization coefficient calculation by the method by Shashua will be described below in detail. Shashua indicates that when it is assumed that a parallel light source and the surface of an object are all perfectly diffuse reflectors, an image in an arbitrary light source direction can be expressed by linear combination of three images different in light source direction. In other words, an image $I_4$ in an arbitrary light source direction can be expressed by linear combination as in the following expression, wherein $I_1$, $I_2$, and $I_3$ are the images in terms of vectors, of which light source direction is different from one another.

$$I_4 = c_4^1 I_1 + c_4^2 I_2 + c_4^3 I_3 \quad \text{(Expression 2)}$$

At this time, $c_4 = [c_4^1 c_4^2 c_4^3]^T$ is calculated as a linearization coefficient for the image $I_4$.

Specifically, as shown in FIG. 6, three points of pixel coordinates $P_1(x_1, y_1)$, $P_2(x_2, y_2)$, $P_3(x_3, y_3)$ are selected in each of the four images $I_1$, $I_2$, $I_3$, $I_4$, and the linearization coefficient is calculated by the following expression using pixel values i in the respective coordinates of the selected three points $P_1$, $P_2$, $P_3$.

$$\begin{bmatrix} i_{1(x_1, y_1)} & i_{2(x_1, y_1)} & i_{3(x_1, y_1)} \\ i_{1(x_2, y_2)} & i_{2(x_2, y_2)} & i_{3(x_2, y_2)} \\ i_{1(x_3, y_3)} & i_{2(x_3, y_3)} & i_{3(x_3, y_3)} \end{bmatrix} \cdot c_4 = \begin{bmatrix} i_{4(x_1, y_1)} \\ i_{4(x_2, y_2)} \\ i_{4(x_3, y_3)} \end{bmatrix} \quad \text{(Expression 3)}$$

$$c_4 = \begin{bmatrix} i_{1(x_1, y_1)} & i_{2(x_1, y_1)} & i_{3(x_1, y_1)} \\ i_{1(x_2, y_2)} & i_{2(x_2, y_2)} & i_{3(x_2, y_2)} \\ i_{1(x_3, y_3)} & i_{2(x_3, y_3)} & i_{3(x_3, y_3)} \end{bmatrix}^{-1} \begin{bmatrix} i_{4(x_1, y_1)} \\ i_{4(x_2, y_2)} \\ i_{4(x_3, y_3)} \end{bmatrix}$$

$$= D^{-1} \begin{bmatrix} i_{4(x_1, y_1)} \\ i_{4(x_2, y_2)} \\ i_{4(x_3, y_3)} \end{bmatrix}$$

$$\text{wherein } D = \begin{bmatrix} i_{1(x_1, y_1)} & i_{2(x_1, y_1)} & i_{3(x_1, y_1)} \\ i_{1(x_2, y_2)} & i_{2(x_2, y_2)} & i_{3(x_2, y_2)} \\ i_{1(x_3, y_3)} & i_{2(x_3, y_3)} & i_{3(x_3, y_3)} \end{bmatrix}$$

Wherein, $i_{k(x, y)}$ is a pixel value of pixel coordinates (x, y) in an input image k.

By (Expression 3), the linearization coefficient $c_4 = [c_4^1 c_4^2 c_4^3]^T$ can be calculated. Accordingly, the image $I_4$ in the arbitrary light source direction can be expressed using $I_1$, $I_2$, $I_3$, and $c_4 = [c_4^1 c_4^2 c_4^3]^T$. In the case where $D^{-1}$ cannot be calculated, another three-point set $P_1(x_1, y_1)$, $P_2(x_2, y_2)$, $P_3(x_3, y_3)$ is reselected. The selection of the three points $P_1$, $P_2$, $P_3$ and the derivation of the linearization coefficient are disclosed in detail in "Photometric Linearization based on Classification of Photometric Factors," (Image Recognition/Comprehension Symposium (MIRU2002) Transactions, vol. 2, pp. 167-176, 2002), for example.

By the method by Shashua, calculation in (Expression 3) is performed for the A region in the four images of the selected overlap image group to obtain the linearization coefficient. In this time, the linearization coefficient $c_4 = [c_4^1 c_4^2 c_4^3]^T$ is calculated using $I_1$, $I_2$, $I_3$ as the three images each including the B region and $I_4$ as the to-be-expanded image not including the B region.

Wherein, when it is premised that the light source is a parallel light source and the surface of the object is a perfectly diffuse reflector, as described here, an image in an arbitrary light source direction can be synthesized using four images, and therefore, four images each including the A region are selected as the overlap image group in the present embodiment.

Further, a diffuse reflection pixel means a pixel behaving as (Expression 2).

Next, reliability of the linearization coefficient calculated in the step S12 is judged in a step S13. The linearization coefficient reliability judgment herein is to judge independency among the three images each including the B region of the overlap image group. In a specific judgment method, a condition number (the number of conditions) of the matrix D calculated in the step S12 is used, for example. Namely, the condition number of the matrix D is obtained and it is judged that the selected three images each including the B region are independent and the calculated linearization coefficient is reliable when the condition number is smaller than a predetermined threshold value. When it is larger than the predetermined threshold value otherwise, it is judged that the linearization coefficient is less reliable, so that the routine returns to the step S11 to perform reselection of an overlap image group that has the same A region and is different from the previously selected overlap image group.

A factor in judging that the reliability is less is either of the followings:

The normal direction is the same among two or more of the three selected pixels in any of the images.

The light source state is the same in at least two images.

If a linearization coefficient with low reliability is used, a panorama image with large error in intensity is synthesized. In contrast, when it is judged that the linearization coefficient is reliable, conditions that the three images each including the B region are different from one another in the light source direction and includes three or more pixels different from one another in the normal direction of the surface of the object are satisfied. When the linearization coefficient with such high reliability is used, a panorama image with less error in intensity can be synthesized. The error in intensity means an intensity error between a generated panorama image and an ideal panorama image shot under the same light source environment as that in the to-be-expanded image.

It is noted that if a plurality of candidates for the overlap image group having the same A region in selecting an overlap image group in the step S11, a group of which calculated linearization coefficient is reliable the most may be selected. Specifically, a candidate in which the aforementioned condition number is the smallest may be selected as the overlap image group. This is because the calculated linearization coefficient is more reliable or the three images each including the B region included in the selected overlap image group are more independent as the condition number is smaller.

In the processes of the steps S11 to S113, an optimum linearization coefficient is calculated by selecting overlap images and each three-point sets in the selected images by referencing the presence or the absence of $D^{-1}$ in (Expression 3) and the condition number of D with high reliability. Any other methodology may be employed only when it uses the same references. For example, it is possible that each condition number of $D^{-1}$ and D is calculated simultaneously in the step S12, reliability judgment of the calculated condition numbers of $D^{-1}$ and D is performed in the step S13, and reselection of three points $P_1(x_1, y_1)$, $P_2(x_2, y_2)$, $P_3(x_3, y_3)$ is performed when the reliability is judged low. In this case, if a linearization coefficient with high reliability cannot be selected even when the selection of the three points $P_1(x_1, y_1)$, $P_2(x_2, y_2)$, $P_3(x_3, y_3)$ is repeated predetermined times, overlap image reselection may be performed.

Then, when it is judged that the linearization coefficient is reliable (Yes in S13), the to-be-expanded image is expanded in size using this linearization coefficient and the pixel values of the three images each including the B region. Herein, the to-be-expanded image $I_4$ is expanded in size up to "the image region of $I_4$ plus the B region" by assigning the linearization coefficient $C_4$ judged reliable and the pixel values in the B region of the images $I_1$, $I_2$, $I_3$ to (Expression 2). In this way, in order to expand the to-be-expanded image $I_4$ using (Expression 2), each of the three images $I_1$, $I_2$, $I_3$ must include an overlap region (i.e., B region) in a region other than the image region of the to-be-expanded image $I_4$.

As described above, the steps S11 through S14 leads to expansion in size of the to-be-expanded image included in the overlap image group to "the original image region plus the B region." Hence, the repetition of this processing enables a panorama image of which light source environment is uniform over the whole to be generated easily.

Next, in a step S15, whether or not the image is expanded to the whole region of a desired panorama image is judged. When it is judged that the image is not expanded to the whole region yet (No in S15), the image expanded in the step S14 is stored in the storage medium of the image storage section 103 (step S16) and the routine returns to the step S11. When it is judged that the image is expanded to the whole region otherwise (Yes in S15), the panorama image is stored in the storage medium of the image storage section 103 (step S17). Referring to the judgment method in the step S15, the image may be judged to be expanded to the whole region when the number of pixels of the expanded image becomes the number of pixels of the whole region, for example. A memory, a hard disk, film or the like may be used as the storage medium for storing the panorama image. In this way, repetition of the processes of the steps S11 through S16 causes one panorama image extended to the whole region of which light source environment is uniform to be stored in the image storage section 103. The steps S11 through S16 realize the panorama image synthesis method according to the present embodiment.

Subsequently, end judgment is performed (step S18). In the present embodiment, as will be described later, it is necessary for object detection to generate three panorama images different in light source direction from one another. For this reason, herein, the processing ends when three or more panorama images with inter-image independency are present in the image storage section 103 (Yes in S18). When two or less panorama images with inter-image independency are present (No in S18), the routine returns to the step S11 to synthesize another panorama image.

For the judgment, a value of the determinant may be used, for example. Specifically, arbitrary three panorama images (suppose them $I_1^P$, $I_2^P$, and $I_3^P$) are selected from the panorama images stored in the image storage section 103, the pixel values of three points $P_1(x_1, y_1)$, $P_2(x_2, y_2)$, $P_3(x_3, y_3)$ in each selected panorama images $I_1^P$, $I_2^P$, $I_3^P$ are adopted in the form of the matrix D in (Expression 3), and then, the determinant $|D|$ is calculated. Then, it is judged that the light source direction is different among the three panorama images $I_1^P$, $I_2^P$, $I_3^P$ when the value of the determinant $|D|$ is not 0 to end the processing.

When the value of the determinant |D| is 0, which means judgment that the selected three panorama images $I_1^P, I_2^P, I_3^P$ have no independency, another combination of three panorama images stored in the image storage section 103 is selected to perform the same processing. If selection of any combinations of three panorama images stored in the image storage section 103 results in 0 as the value of the determinant, the routine returns to the step S11. When the number of the panorama images is two or smaller, the routine returns to the step S11, of course.

Execution of the above processing synthesizes three panorama images with inter-image independency in the panorama image synthesis section 104.

Figure 9:
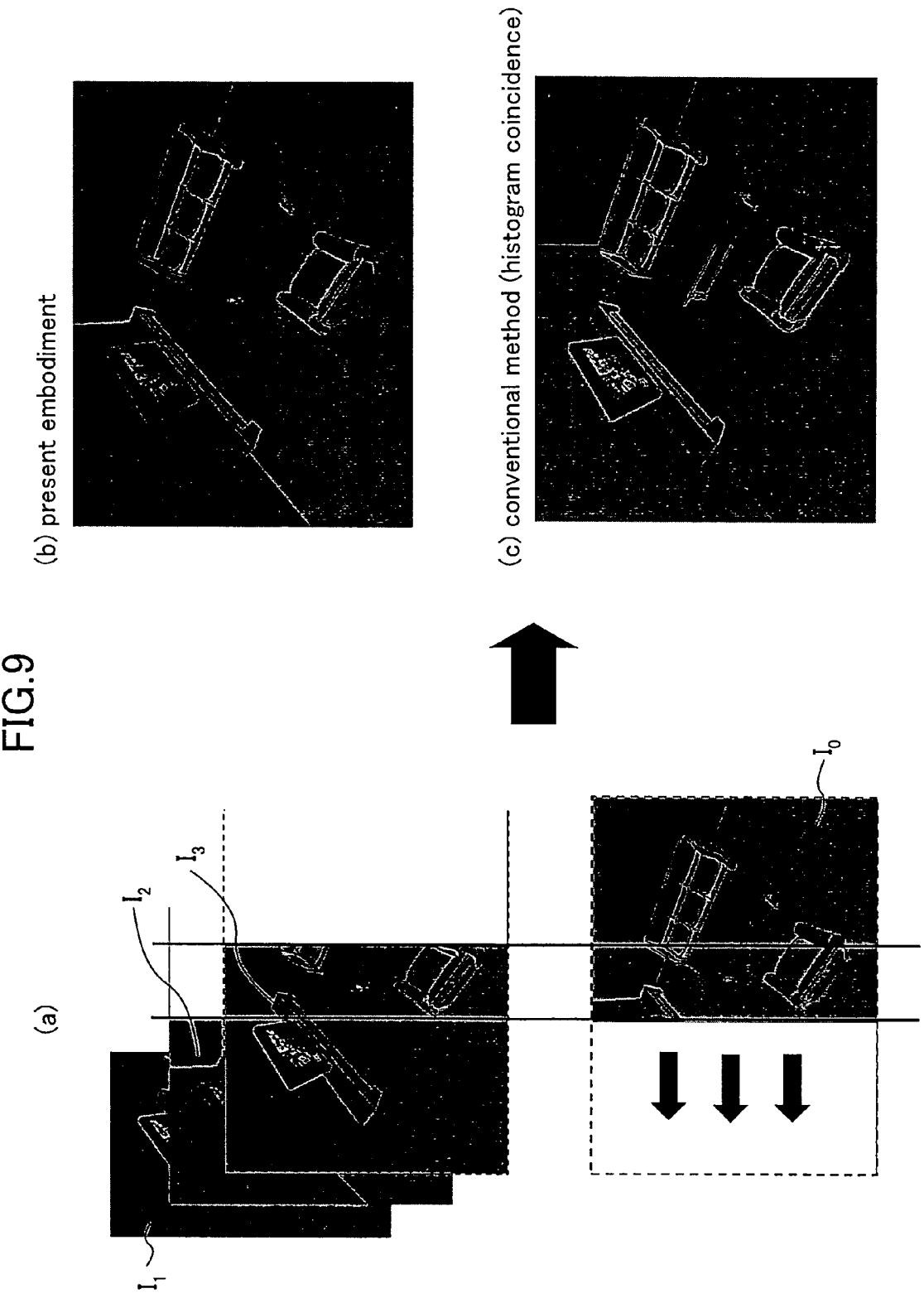
FIG. 9 is a drawing showing one example of a panorama image synthesized by the panorama image synthesis method according to Embodiment 1 of the present invention.

FIG. 9 shows one example of a panorama image synthesized by the panorama image synthesis method according to the present embodiment, wherein FIG. 9(a) shows a to-be-expanded image $I_0$ of which image size is to be expanded and three images $I_1, I_2, I_3$ different from one another in the light source direction; FIG. 9(b) is a panorama image synthesized using the overlap region of the four images $I_0, I_1, I_2, I_3$ in FIG. 9(a) so that the light source environment is the same as that of the image $I_0$; and FIG. 9(c) is an image synthesized using the images $I_0, I_1$ by histogram coincidence, which is one of conventional methods (in detail, see "Image Analysis Handbook," Tokyo University Shuppankai pp. 463, 1991), so that the light source environment is the same as that of the image $I_0$.

As understood from comparison with the image of FIG. 9(c), the panorama image of FIG. 9(b) has less intensity error and no joint is observed in the image. In other words, by the panorama image synthesis method according to the present embodiment, a panorama image with less intensity error can be synthesized even using images different from one another in the light source direction.

Wherein, the panorama image synthesized by the method according to the present embodiment is a panorama image composed of only diffuse reflection pixels. Such an image is called a panorama base image.

<Object Detection Using Panorama Image>

The object detection section 105 performs object detection in an image received from the shot image correction section 102, using three panorama images input from the panorama image synthesis section 104. The object detection herein employs a background subtraction, for example.

Figure 7:
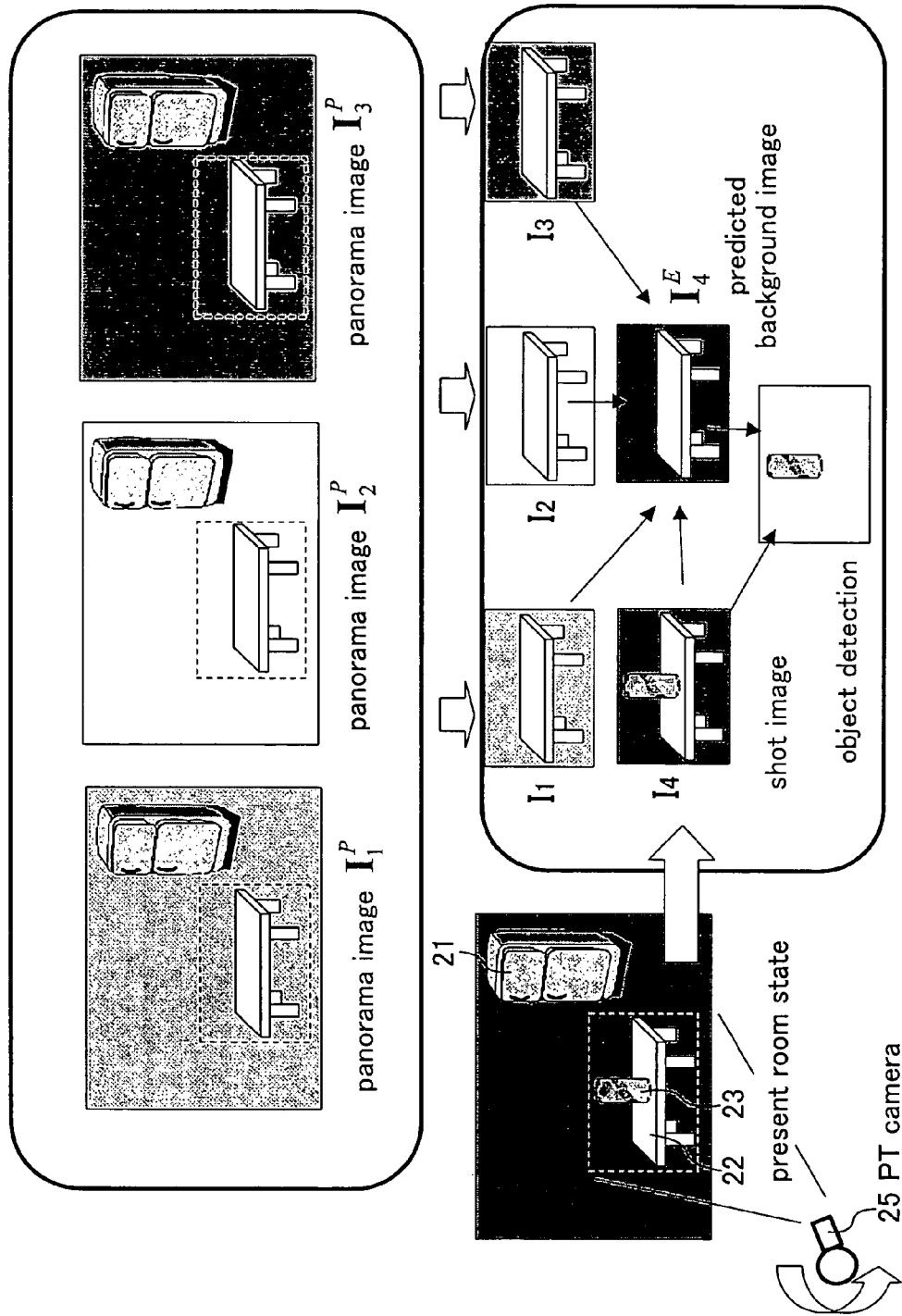
FIG. 7 is an illustration showing object detection using panorama images.

An example of object detection employing the background subtraction in the present embodiment will be described with reference to FIG. 7. FIG. 7 shows the case where in a room where a refrigerator 21 and a table 22 are installed, the table 22 is shot and an object (an empty can 23) placed on the table 22 is detected from the image. $I_1^P, I_2^P$, and $I_3^P$ indicate panorama images input from the panorama image synthesis section 104, in which the floor, the refrigerator 21, and the table 22 are reflected as a background. The three panorama images $I_1^P, I_2^P, I_3^P$ are already synthesized using images shot before an image to be used for object detection is shot. Suppose that an image $I_4$ is shot by a PT camera 25. In the image $I_4$, the empty can 23 is on the table 22.

Images $I_1, I_2, I_3$ corresponding to an image region of the image $I_4$ are cut out form the panorama images $I_1^P, I_2^P, I_3^P$, respectively, and the linearization coefficient $c_4=[c_4^1 c_4^2 c_4^3]^T$ is calculated by (Expression 3) using these images $I_1, I_2, I_3, I_4$. In the image $I_4$, an object (the empty can 23 in the example of FIG. 7) other than the background is present. Therefore, it is probable that points other than the background are selected as three points $P_1, P_2, P_3$ in calculation of the linearization coefficient $c_4=[c_4^1 c_4^2 c_4^3]^T$ using (Expression 3) (points $P_1, P_2, P_3$ in the region reflecting the empty can 23 are selected, for example). In this case, accurate linearization coefficient calculation cannot be performed. Wherein, three points $P_1, P_2, P_3$ on the background components of all the four images can be selected by employing RANSAC (see "Random sample consensus: a paradigm for model fitting with application to image analysis and automated cartography," by M A Fischler and R. C. Bolles, Commun, Assoc. Comp, pp. 381-395, Mar. 24, 1981). This enables the linearization coefficient calculation with no influence of things other than the background (in detail, see "Image Linearization Using Classification Standard of Optical Phenomena," (Image Recognition/Comprehension Symposium (MIRU2002) Transactions, vol. 2, pp. 167-176, 2002). Assignment of the thus calculated linearization coefficient $c_4$ and the pixel values of the images $I_1, I_2, I_3$ to (Expression 2) attains generation of a predicted background image $I_4^E$ corresponding to the image $I_4$ shot under the present illumination condition. Then, a region where a difference in pixel value between the predicted background image $I_4^E$ and the original image $I_4$ is larger than a threshold value is detected as an object region.

Then, the detected object display section 106 displays the object region detected by the object detection section 105 in a display device such as a monitor.

As described above, according to the present embodiment, image expansion using linearization leads to generation of a panorama image of which light source environment is uniform over the whole. With the use of plural panorama images thus obtained, an object can be detected by the background subtraction from the image shot under an arbitrary light source environment.

It is noted that the present embodiment uses (Expression 3) for the linearization coefficient calculation, wherein (Expression 3) is an expression in the case where the pixels of three selected points $P_1, P_2, P_3$ are supposed to be all diffuse reflection pixels. Under actual environment, an image includes components other than diffuse reflection such as mirror reflection, so that (Expression 3) may not necessarily be established. However, when the method by Shakunaga et al. (in detail, see "Image Linearization Using Classification Standard of Optical Phenomena," Image Recognition/Comprehension Symposium (MIRU2002) Transactions, vol. 2, pp. 167-176, 2002) is employed, the selection of three points $P_1, P_2, P_3$ of which pixels are all diffuse reflection pixels can be enabled with no influence of pixel values other than the diffuse reflection pixels.

Further, it is premised in the present embodiment that the light source is a parallel light source, so that an accurate linearization coefficient can be calculated with the use of four images in the panorama image synthesis and the object detection. However, light sources under actual environment include ambient light such as inter-reflection, and therefore, it is probable that only a linearized image with large difference (error) from an actual image is obtained when the linearization coefficient is calculated using four images. However, even under a light source condition including such ambient light, accurate calculation of a linearization coefficient can be attained with the use of five or more images, enabling image expansion using image linearization and object detection as in the present embodiment. For example, it has been already reported that image linearization with less error is attained with the use of four to nine images even under light source environment including ambient light (in detail, see "Separation of Reflection Components Based on Frequency Characteristics of Bidirectional Reflectance Distribution Functions,"

Research Report of Information Processing Society of Japan, CVIM 2002-134-1, pp. 1-8, 2002).

Embodiment 2

As described above, images shot under actual environment include many pixels other than the diffuse reflection pixels. These pixels become noise through the image synthesis processing to serve as a cause for increasing the intensity error in a generated panorama image. Low independency in the image group having an overlap region also serves as a cause for increasing the intensity error in a panorama image. In this connection, in a system in which images are sequentially input, such as a monitoring system, it is preferable to update the panorama image if a panorama image with less intensity error than that of an already-generated panorama image can be obtained in receiving a newly input image. In this case, noise influence caused by pixels other than diffuse reflection pixels can be minimized.

Figure 4:
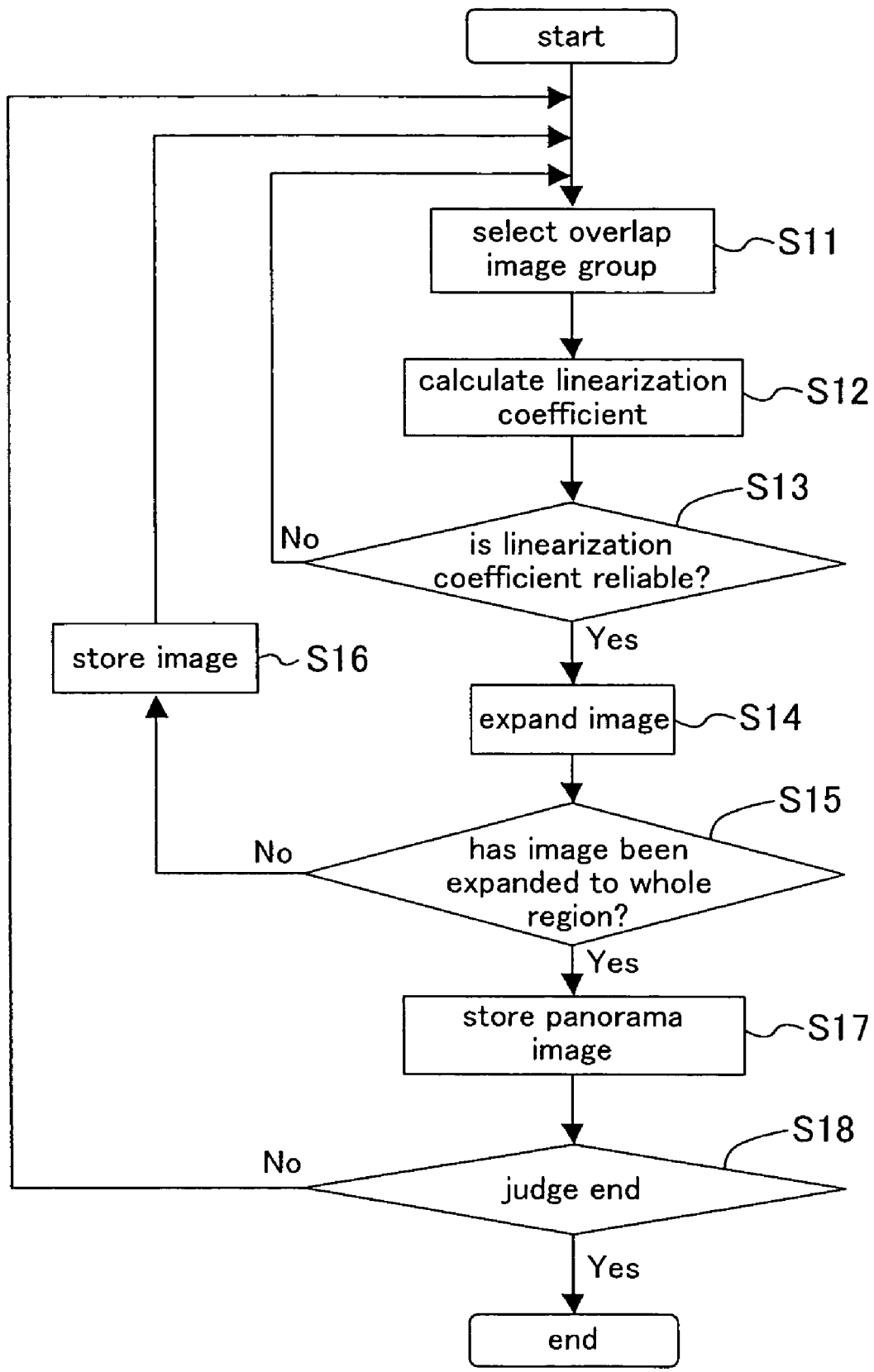
FIG. 4 is a flowchart depicting operation of a panorama image synthesis section in FIG. 1 which is a panorama image synthesis method according Embodiment 1 of the present invention.
Figure 8:
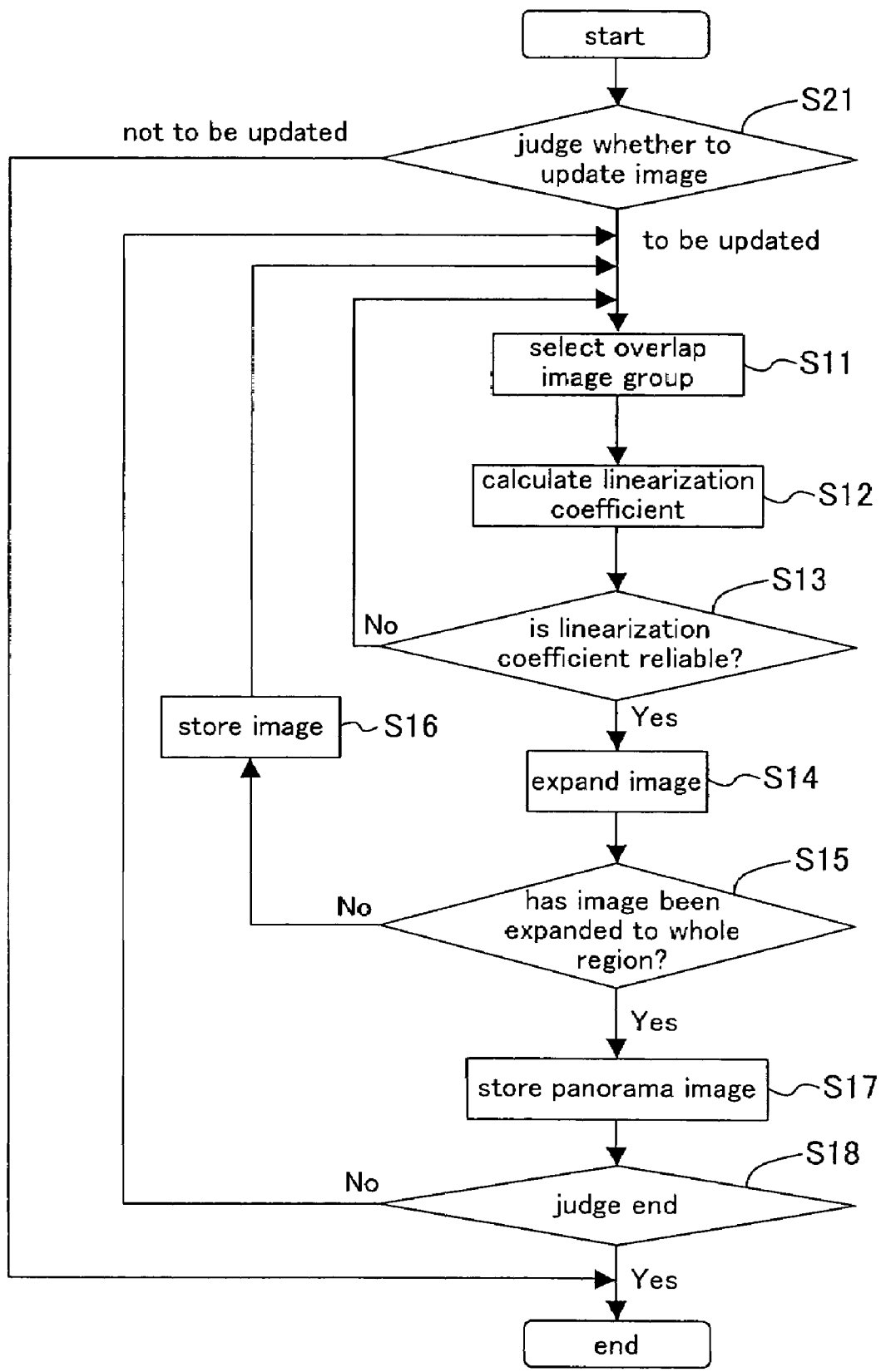
FIG. 8 is a flowchart depicting a panorama image synthesis method according to Embodiment 2 of the present invention.

In Embodiment 2 of the present invention, the panorama image is updated appropriately, in addition to the constitution of Embodiment 1. The constitution of an object detection system according to the present embodiment is the same as that in FIG. 1, wherein difference lies in that the panorama image is updated in the panorama image synthesis section 104. FIG. 8 is a flowchart depicting the operation of the panorama image synthesis section 104 in the present embodiment. In FIG. 8, the same references as in FIG. 4 are allotted to the same steps as in FIG. 4 and the detailed description thereof is omitted herein. Difference from Embodiment 1 lies in that a step S21 of judging whether the panorama image is updated or not is included.

In detail, in the step S21, when a new image is input in the image storage section 103, an overlap image group is reselected and the suitability is compared between the new overlap image group and a former overlap image group both of which include the same overlap region. Then, when it is judged that the new overlap image group is more suitable for image synthesis, it is judged that the panorama image is to be updated (Yes in S21) and the routine proceeds to the step S11 and the following steps. Otherwise (No in S21), update of the panorama image is not performed.

Wherein, the new overlap image group means an overlap image group obtained by combining, at the time when the new image is input in the image storage section 103, the newly input image and images stored until then. The combination can be attained by employing the conditions and the method already as described with reference to the step S11.

Referring to the judgment about the suitability for the image synthesis, it is possible, for example, that: synthesized images are generated by performing the processes of the steps S12 through S14 using the new overlap image group and the former overlap image group, respectively; the number of diffuse reflection pixels is compared between the generated synthesized images; and it is judged that one of the images whose number of the pixels is larger has the suitability. For detecting the diffuse reflection pixels, for example, pixels having pixel values equal to or smaller than a threshold value are defined as shadow pixels, pixels having pixel values equal to or larger than a threshold value are defined as mirror reflection pixels, and the total sum of the pixels from which the shadow pixels and the mirror reflection pixels are subtracted is used as the number of the diffuse reflection pixels.

As another method for judging the suitability for the image synthesis, the suitability for the image synthesis may be judged using the total number of diffuse reflection pixels in each overlap image group. In the linearization coefficient calculation in the step S12, less accurate linearization coefficient is calculated if a shadow pixel or a mirror reflection pixel is selected as the pixel used for the calculation. Accordingly, more accurate linearization coefficient calculation is expected as the number of diffuse reflection pixels is larger in the A region in the overlap image to be used. Therefore, panorama image update is performed when the total number of the diffuse reflection pixels in the images in the A region of the new overlap image group is larger than the total number of the diffuse reflection pixels in the images in the A region of the former overlap image group.

As still another method for judging the suitability for the image synthesis, the suitability for the image synthesis may be judged using, for example, inter-image independency. In detail, the panorama image is updated when the inter-image independency is higher in the new overlap image group than in the former overlap image group. The judgment about the inter-image independency may be attained by the method described with reference to the step S13 (the condition number is calculated and it is judged that the independency is higher as the condition number is smaller). Alternatively, it is possible that the condition number of the new overlap image group is calculated using the intensity values at the same coordinate positions as those at the tree points used in the linearization coefficient calculation of the former overlap image group and the panorama image is updated when the calculated condition number of the new overlap image group is smaller than the condition number of the former overlap image group.

As described above, in the present embodiment, the panorama image is updated when a more suitable overlap image group is obtained by image synthesis, enabling generation of a panorama image with less intensity error. In association therewith, accuracy in object detection is further enhanced.

Embodiment 3

In the above described panorama image synthesis methods, an image is expanded by sequentially repeating the linearization coefficient calculation. However, in this image expansion, the intensity error evaluation can be performed to each image in the A region only sequentially, and therefore, the image expansion by the repetitive calculation accumulates noise and quantization error included in the images. This causes an increase in intensity error in a finally synthesized panorama image. In this connection, it is preferable to synthesize an image so that accumulation of errors caused due to such repetitive calculation is minimized in the case where a plurality of image combinations used until expansion to a desired image size is considered. This attains a panorama image with less intensity error, enhancing the accuracy of object detection.

In Embodiment 3 of the present invention, an error caused due to repetitive operation for panorama image synthesis is minimized, in addition to the constitution of Embodiment 1. The constitution of an object detection system according to the present embodiment is the same as that in FIG. 1, while the panorama image synthesis section 104 performs linearization coefficient calculation by a processing methodology different from that in Embodiment 1 when the image storage section 103 includes a generally-called evaluation image group.

The "evaluation image group" herein is defined as "an image group among image groups of to-be-expanded images and images jointed as overlap image groups, in which at least one image of which light source environment is the same as that in the to-be-expanded image is present." More specifically, an N-image set composed of a given to-be-expanded image $I_0$ and an overlap image group of the present invention is specified first, another N-image set composed of the B region in the previously specified N-image set which is used as a to-be-expanded image and another overlap image group is specified, and then, still another N-image set composed of the B region in the N-image set and still another overlap image group is specified. As such, the N-image sets composed of overlap image groups are specified sequentially so as to be jointed. Then, when the finally specified N-image set overlaps an image of which light source environment is the same as that in the original to-be-expanded image $I_0$, the plurality of N-image sets and the original to-be-expanded image $I_0$, which have been specified until then, are used as the "evaluation image group."

By employing this evaluation image group, the intensity error can be evaluated using the plural A regions in combination, enabling synthesis of a panorama image with less intensity error, compared with in Embodiment 1 in which an image is expanded while performing sequential intensity error evaluation in each A region.

It is noted that the original to-be-expanded image itself is used as an image of which light source environment is the same as that in the original to-be-expanded image. An example using an image other than the original to-be-expanded image will be described later.

Figure 10:
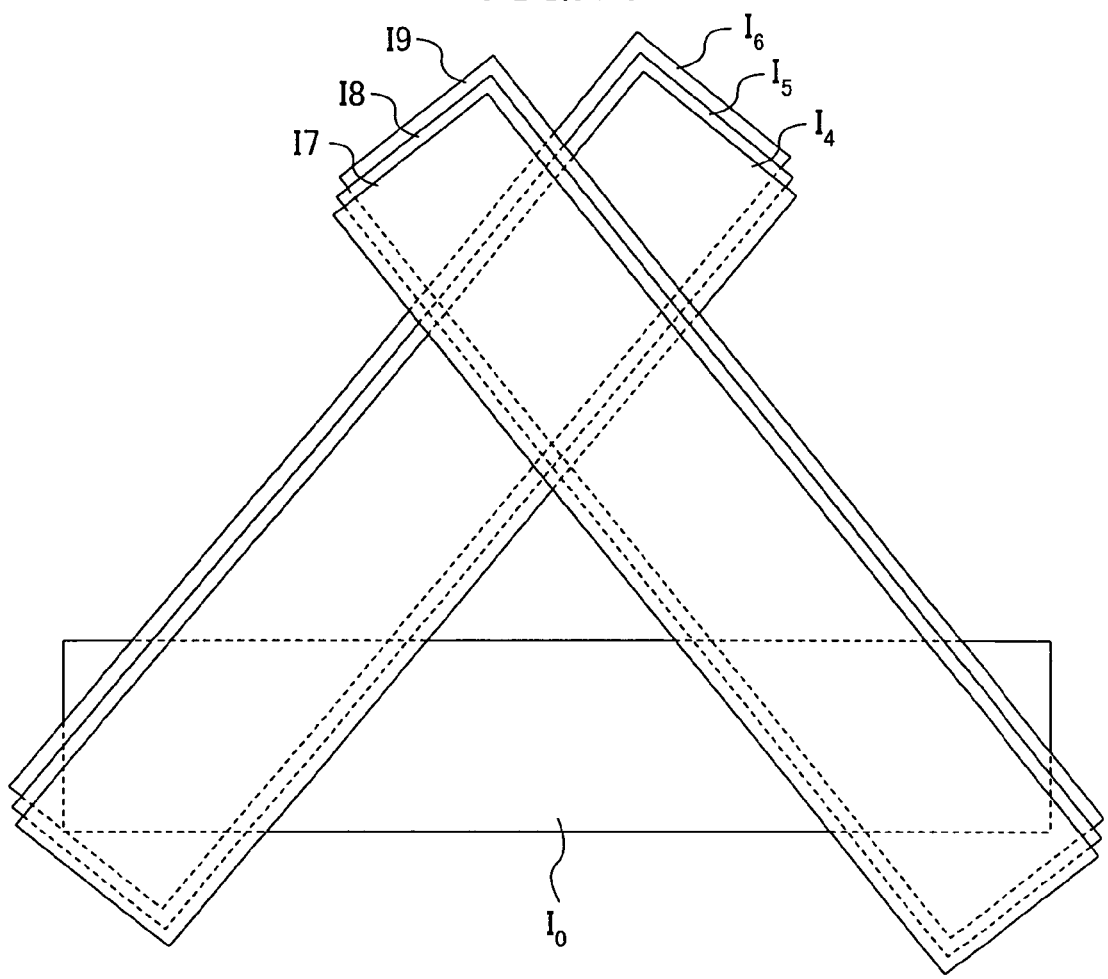
FIG. 10 is a drawing showing an example of an evaluation image group.
Figure 11:
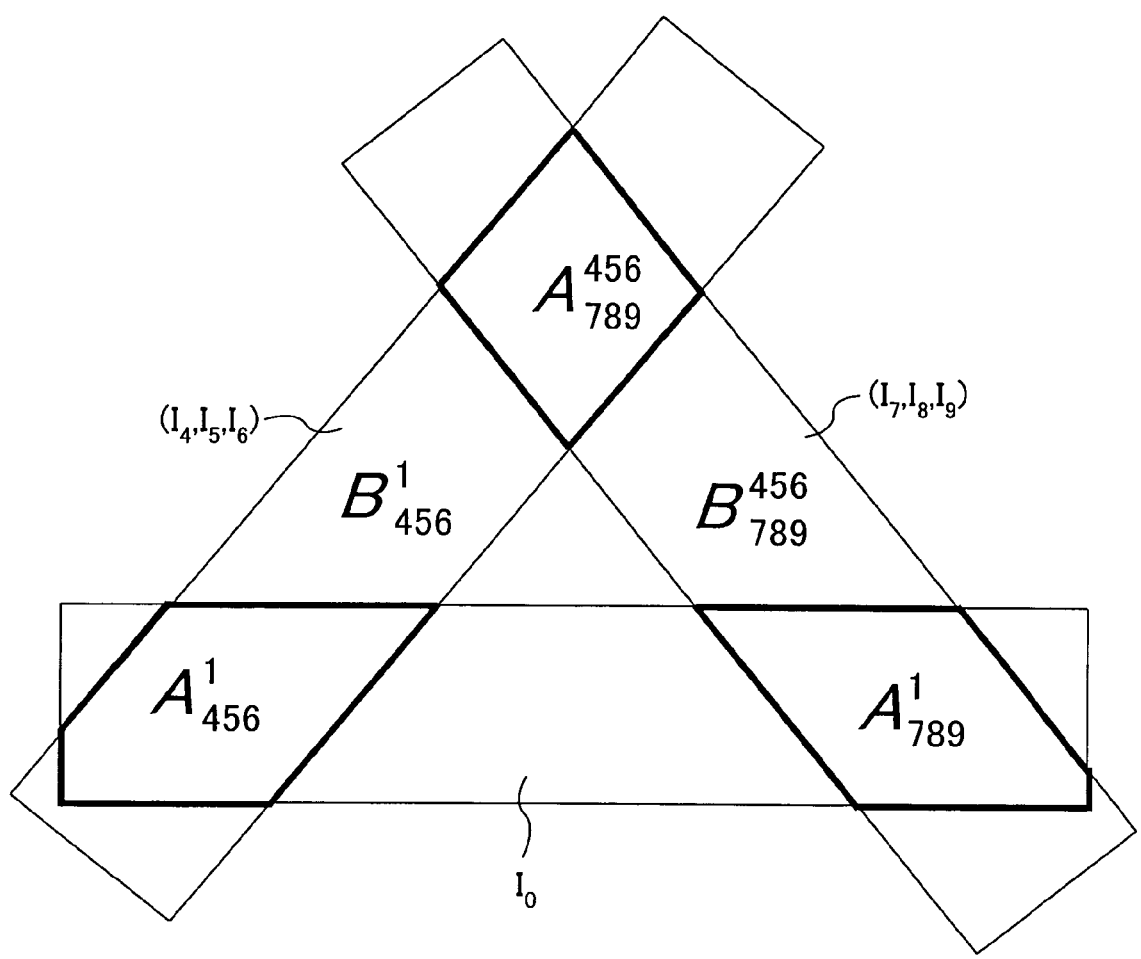
FIG. 11 is a drawing illustrating FIG. 10 schematically.

FIG. 10 shows a concrete example of the evaluation image group. FIG. 10 is the simplest example where valuation image groups $(I_4, I_5, I_6)$, $(I_7, I_8, I_9)$ for an image $I_0$ are present. $(I_4, I_5, I_6)$ and $(I_7, I_8, I_9)$ are image groups having the same angle of view, and FIG. 11 illustrates them as one image schematically. In FIG. 11, $I_0$ is jointed to the two overlap image groups $((I_4, I_5, I_6)$ having $A_{456}{}^1 + B_{456}{}^1$ and $(I_7, I_8, I_9)$ having $A_{789}{}^1 + B_{789}{}^{456}$), and both $A_{456}{}^1$ and $A_{789}{}^1$ belong to the image $I_0$. Accordingly, this state can be regarded as a state that an image (the image $I_0$) of which light source environment is the same as that of the to-be-expanded image is included in each jointed image group, and accordingly, this state can be regarded as a state that $I_0$, $(I_4, I_5, I_6)$, and $(I_7, I_8, I_9)$ serve as an evaluation image group for the image $I_0$.

Figure 12:
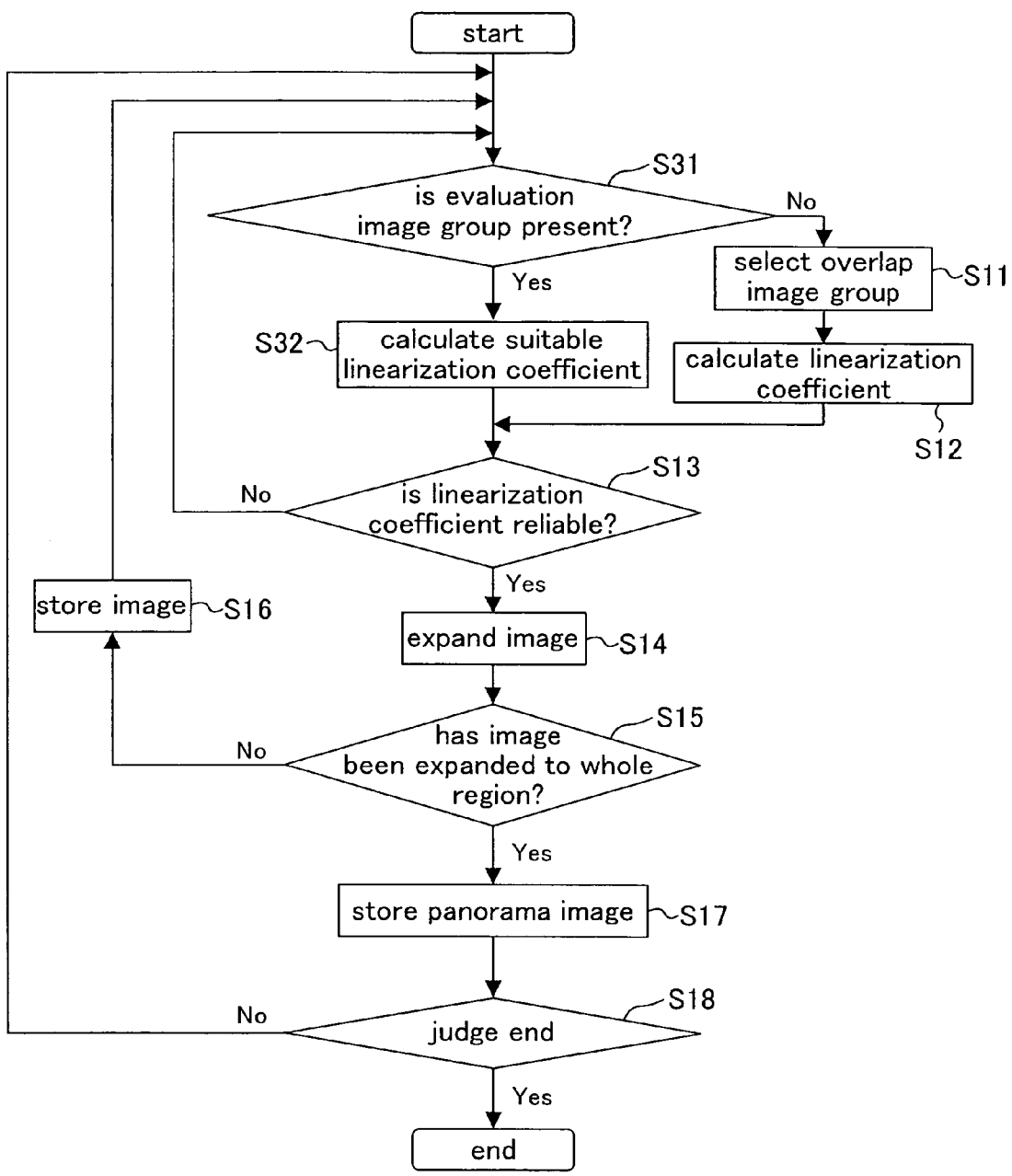
FIG. 12 is a flowchart depicting a panorama image synthesis method according to Embodiment 3 of the present invention.

FIG. 12 is a flowchart depicting the operation of the panorama image synthesis section 104 in the present embodiment. In FIG. 12, the same references as in FIG. 4 are allotted to the same steps as in FIG. 4 and the detailed description thereof is omitted herein. Different from Embodiment 1, Embodiment 3 includes a step S31 of judging whether an evaluation image group is present or not and a step S32 of calculating a linearization coefficient with less error in the case where the evaluation image group is present.

In detail, in the step S31, judgment is performed as to whether an evaluation image group is present or not in the images stored in the image storage section 103. When an evaluation image group is present (Yes in S31), a linearization coefficient with less error is calculated by utilizing an image that belongs to the evaluation image group (S32). Otherwise (No in S31), the step S11 and the following steps are performed likewise Embodiment 1.

Figure 13:
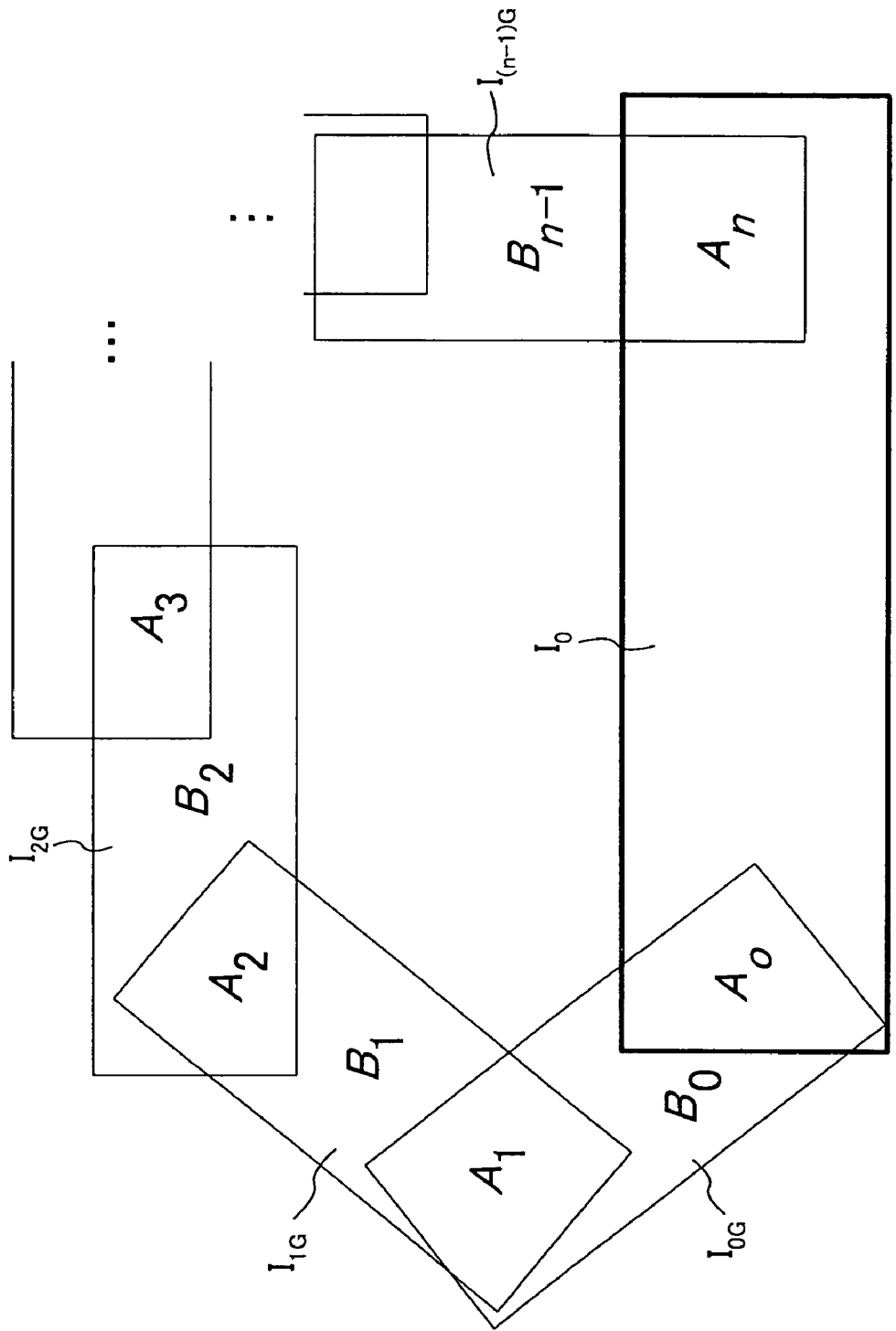
FIG. 13 is a diagram of one example of the evaluation image group.
Figure 14:
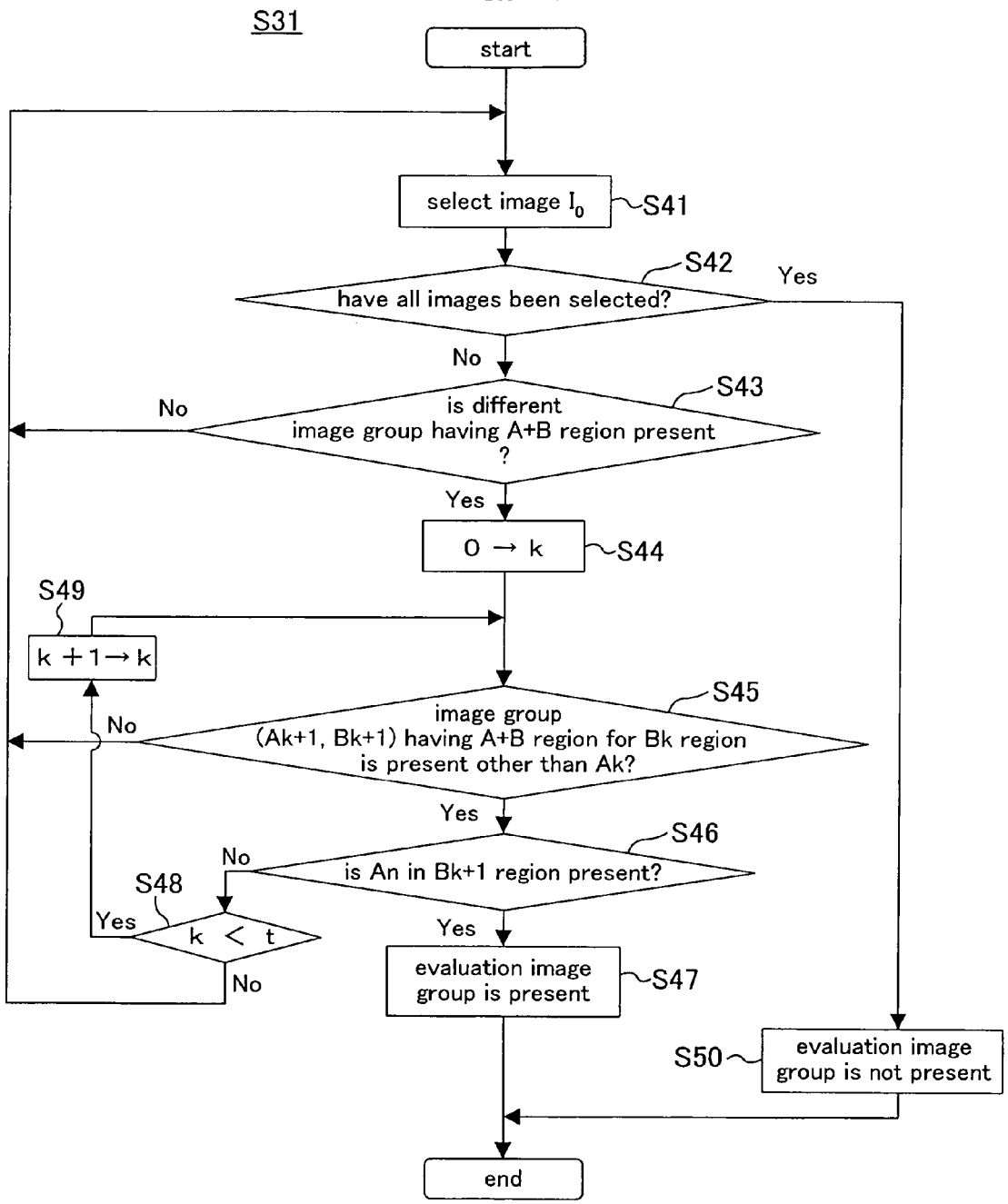
FIG. 14 is a flowchart depicting processing of judging the evaluation image group.

A specific method for judging the presence or the absence of an evaluation image group will be described with reference to FIG. 13 and FIG. 14. FIG. 13 shows on example of an evaluation image group composed of n groups of $I_{0G}$ to $I_{n-1G}$ for an image $I_0$ (the case where an image of which light source environment is uniform is the to-be-expanded image $I_0$ itself). Wherein, $I_{kG}$ indicates a k-th image group $I_k$, $A_k$ indicates a k-th A region, and $B_k$ indicates a k-th B region (k=0, 1, ..., n). FIG. 14 is a flowchart depicting the detailed processing flow of the evaluation image group judgment step S31. The processing flow of S31 will be descried with reference to FIG. 14.

First, in a step S41, one arbitrary image 10 is selected from the images stored in the image storage section 103.

Next, whether all the images stored in the image storage section 103 have been selected or not in the step S41 is judged in a step S42. The judgment may be performed in such a manner that a history of the images $I_0$ selected in the step S41 is stored in a memory and reference is made to the images stored in the image storage section 103. When the judgment results in that all the images have been selected (Yes in S42), it is judged that there is no evaluation image group (S50).

When it is judged that not all images are selected yet (No in S42), judgment is performed in a step S43 as to whether at least two image groups each having the A+B region are present for the image $I_0$ selected in the step S41 or not. The judgment herein can be attained using the overlap region detection method described in Embodiment 1. When the judgment results is that one or no image group is present (No in S43), the routine returns to the step S41 to perform reselection of an image $I_0$. While, when at lest two image groups are present (Yes in S43), 0 is assigned to k in a step S44.

Next, in a step S45, one group $(A_k, B_k)$ is selected from the image groups judged in the step S43 and judgment is performed as to whether at least one image group $(A_{k+1}, B_{k+1})$ having an A+B region for the $B_k$ region is present in the selected image group or not. The judgment herein can also be attained using the overlap region detection method described in Embodiment 1. At this time, when it is judged that there is no new image group (No in S45), the routine returns to the step S41 to perform image reselection.

When the new image group $(A_{k+1}, B_{k+1})$ is present (Yes in S45), whether $A_n$ is present in the region $B_{k+1}$ or not is judged in a step S46. $A_n$ indicates an A region of an image group not selected in the step S45 among the image groups detected in the step S43. When $A_n$ is present in $B_{k+1}$ (Yes in S46), it is judged that an evaluation image group is present to terminate the processing.

While, when $A_n$ is not present in $B_{k+1}$ (No in Step 46), whether k is smaller than a threshold value t or not is judged (step S48). When k is smaller than the threshold value t (Yes in S48), k is incremented (step S49) and the routine returns to the step S45 to repeat the processing. When k is not smaller than the threshold value t otherwise (No in S48), the routine returns to the step S41 to perform reselection of the image $I_0$.

The threshold value t as the number of times of repetition may be determined as follows, for example. Namely, supposing that the total number of the shot images stored in the image storage section 103 is a, a value of a quotient obtained by dividing a by the number N (3 in each embodiment) of the images including a B region in each overlap image group may be used as the threshold value t.

It is noted that when a plurality of evaluation image groups are present for the image $I_0$, an evaluation image group having the highest independency among N images in each B region present in the evaluation image group may be selected. For example, it is possible that the condition number of the matrix D described in Embodiment 1 is calculated in each B region and an evaluation image group in which the calculation condition number is equal to or smaller than a threshold value and of which total sum of the condition number in each B region is the smallest is selected as that having the highest independency. In so doing, a panorama image with further less intensity error can be synthesized.

Alternatively, when a plurality of evaluation image groups are present for the image $I_0$, an evaluation image group in which the number of pixels in an image region that the evaluation image group occupies is the largest may be selected. In so doing, the number of times of calculation until synthesis of the final panorama image can be reduced, further reducing the intensity error of the panorama image.

As described above, the processes of the steps S41 through S50 attains the judgment of the presence or the absence of the evaluation image group in the step S31.

Subsequently, in a step S32, a linearization coefficient with less accumulation of errors caused by repetitive calculation is calculated using the evaluation image group selected in the step S31. Referring to a calculation method, it is possible that a plurality of linearization coefficient sets are calculated in each A region in the evaluation image group in advance and a combination of coefficient sets of which intensity error becomes the smallest is selected from combinations of the coefficient sets. The flow of this processing will be descried with reference to FIG. 13.

In FIG. 13, when $C_{k-1}{}^k$ is used as a reference expressing a linearization coefficient set of the k−1-th image group and the k-th image group, the following expressions are established among the images.

$$I_0 = C_0{}^1 I_{1G} \quad \text{(Expression 4)}$$

$$I_{1G} = C_1{}^2 I_{2G} \quad \text{(Expression 5)}$$

$$I_{(n-1)G} = C_{n-1}{}^n I_{nG} \quad \text{(Expression 6)}$$

At this time, plural (N) coefficient sets $C_{k-1}{}^k$ are obtained from (Expression 4) to (Expression 6). On the other hand, the following (Expression 7) is established from (Expression 4) to (Expression 6):

$$I_0 = C_0{}^1 C_1{}^2 \ldots C_{n-1}{}^n I_{nG} \quad \text{(Expression 7)}$$

When an evaluation image group is present, direct comparison of pixel values can be performed between the image $I_0$ (set as $I_0{}^L$) obtained from (Expression 7) and an actual to-be-expanded image $I_0$ in the region $A_n$. Accordingly, when a coefficient set of which evaluation value e_val is the highest is obtained in accordance with the evaluation expression (Expression 8), a linearization coefficient in which accumulation of errors caused by repetitive calculation in the panorama image synthesis is minimized can be calculated. An evaluation function $E_k(A_k)$ may be obtained from the total sum (e_val) of the number of pixels in the k-th A region of which difference in pixel value between $I_k$ and $I_k{}^L$ is equal to or smaller than a threshold value.

$$e\_val = E_{c0}(A_0) + E_{c1}(A_1) + E_{c2}(A_2) + \ldots + E_{c0,c1,c2,\ldots,cn}(A_n) \quad \text{(Expression 8)}$$

In other words, a combination of coefficient sets $C_{k-1}{}^k$ of which evaluation value e_val obtained from (Expression 8) is the highest may be selected from combinations of the N coefficient sets calculated in each A region.

The calculation method of the most suitable linearization coefficient in the step S32 is described above. A specific calculation example will be described below with reference to FIG. 11.

In FIG. 11, the following expression is established between $I_1$ and $(I_4, I_5, I_6)$.

$$[i_1] = [c_1^4 \; c_1^5 \; c_1^6] \begin{bmatrix} i_4 \\ i_5 \\ i_6 \end{bmatrix} \quad \text{(Expression 9)}$$

Also, the following expression is established between $(I_4, I_5, I_6)$ and $(I_7, I_8, I_9)$.

$$\begin{bmatrix} i_4 \\ i_5 \\ i_6 \end{bmatrix} = \begin{bmatrix} c_4^7 & c_4^8 & c_4^9 \\ c_5^7 & c_5^8 & c_5^9 \\ c_6^7 & c_6^8 & c_6^9 \end{bmatrix} \begin{bmatrix} i_7 \\ i_8 \\ i_9 \end{bmatrix} \quad \text{(Expression 10)}$$

While, the following expression is established between $I_1$ and $(I_7, I_8, I_9)$ by (Expression 9) and (expression 10).

$$[i_1] = [c_1^4 \; c_1^5 \; c_1^6] \begin{bmatrix} c_4^7 & c_4^8 & c_4^9 \\ c_5^7 & c_5^8 & c_5^9 \\ c_6^7 & c_6^8 & c_6^9 \end{bmatrix} \begin{bmatrix} i_7 \\ i_8 \\ i_9 \end{bmatrix} \quad \text{(Expression 11)}$$

Wherein, $i_k$ indicates a pixel value of $I_k$. Three coefficient sets $c_1$ are obtained in the $A_{456}{}^1$ using (Expression 9) first. Likewise, three coefficient sets $c_4$, $c_5$, $c_6$ are obtained in $A_{789}{}^{456}$ using (Expression 10). For example, the three coefficient sets of which evaluation values e_val indicated in (Expression 8) are the higher reaches may be obtained by employing RANSAC. In association therewith, 81 kinds of $I_k{}^L$ in total are calculated by combination of the coefficient sets of each three sets $c_1$, $c_4$, $c_5$, $c_6$ from (Expression 9) to (Expression 11). Next, a combination of sets of which evaluation value e (total sum of e_val in each A region) indicated in (Expression 12) is the highest is selected from the 81 kinds.

$$e = E_{c1}(A_{456}{}^1) + E_{c4}(A_{789}{}^{456}) + E_{c5}(A_{789}{}^{456}) + E_{c6}(A_{789}{}^{456}) + E_{c1,c4,c5,c6}(A_{789}{}^1) \quad \text{(Expression 12)}$$

Figure 15:
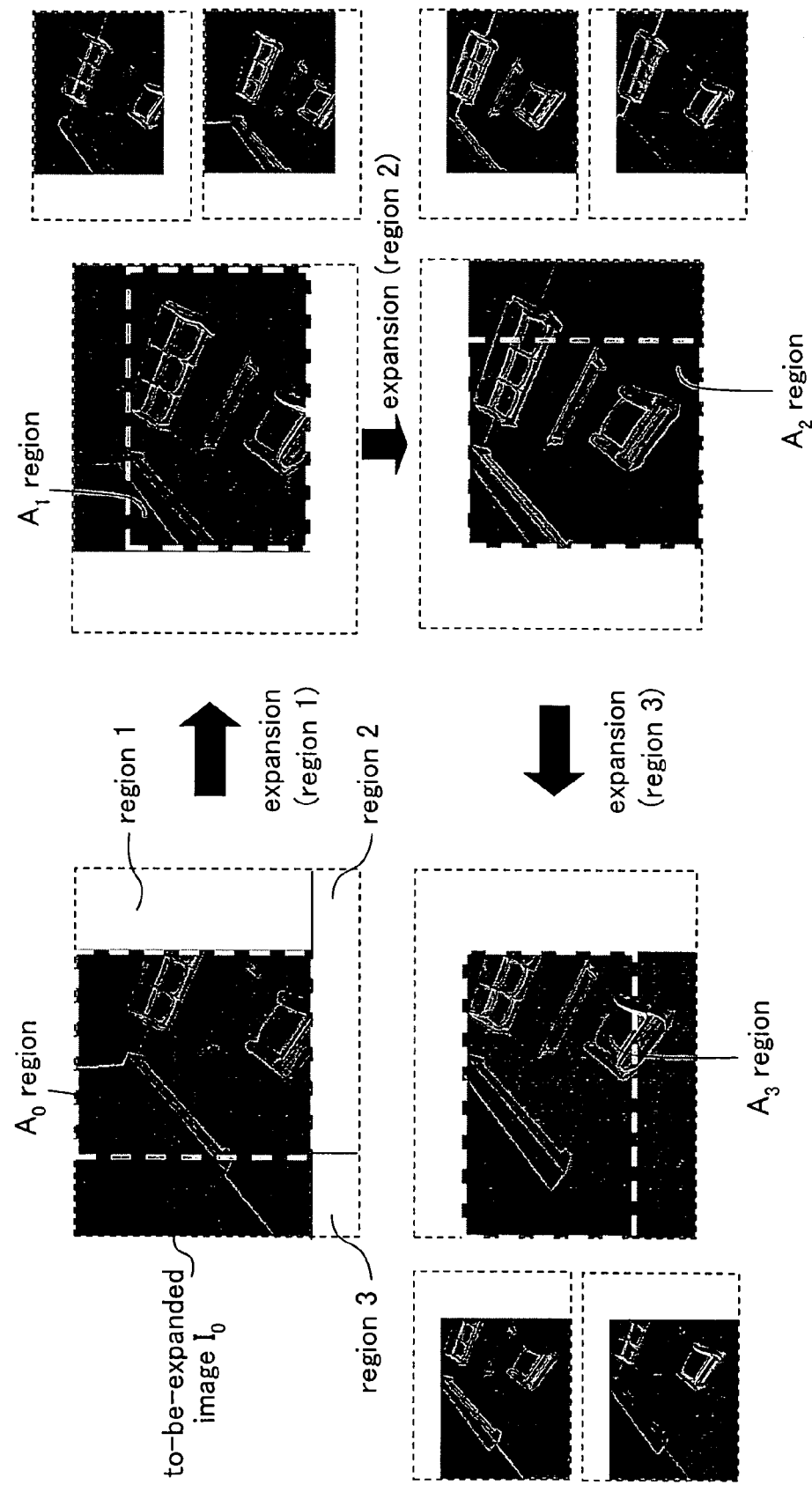
FIG. 15 is a drawing explaining processing of panorama image synthesis.

FIG. 15 is a drawing for explaining the processing of panorama image synthesis according to the present embodiment. The to-be-expanded image $I_0$ is expanded up to a region 1 using an overlap region $A_0$. Likewise, it is expanded up to a region 2 using an overlap region $A_1$, and then, is expanded up to a region 3 using an overlap region $A_2$. For expansion of each region, three sets of which calculated linearization coefficients are the higher reaches are held and a combination of linearization coefficient sets in which the final evaluation value becomes the highest is selected. Herein, a combination is selected so that intensity error (difference in intensity value is 2 or smaller) in the A region between the synthesized image $I_k{}^L$ and the image $I_k$ used for synthesis becomes the smallest.

Figure 16:
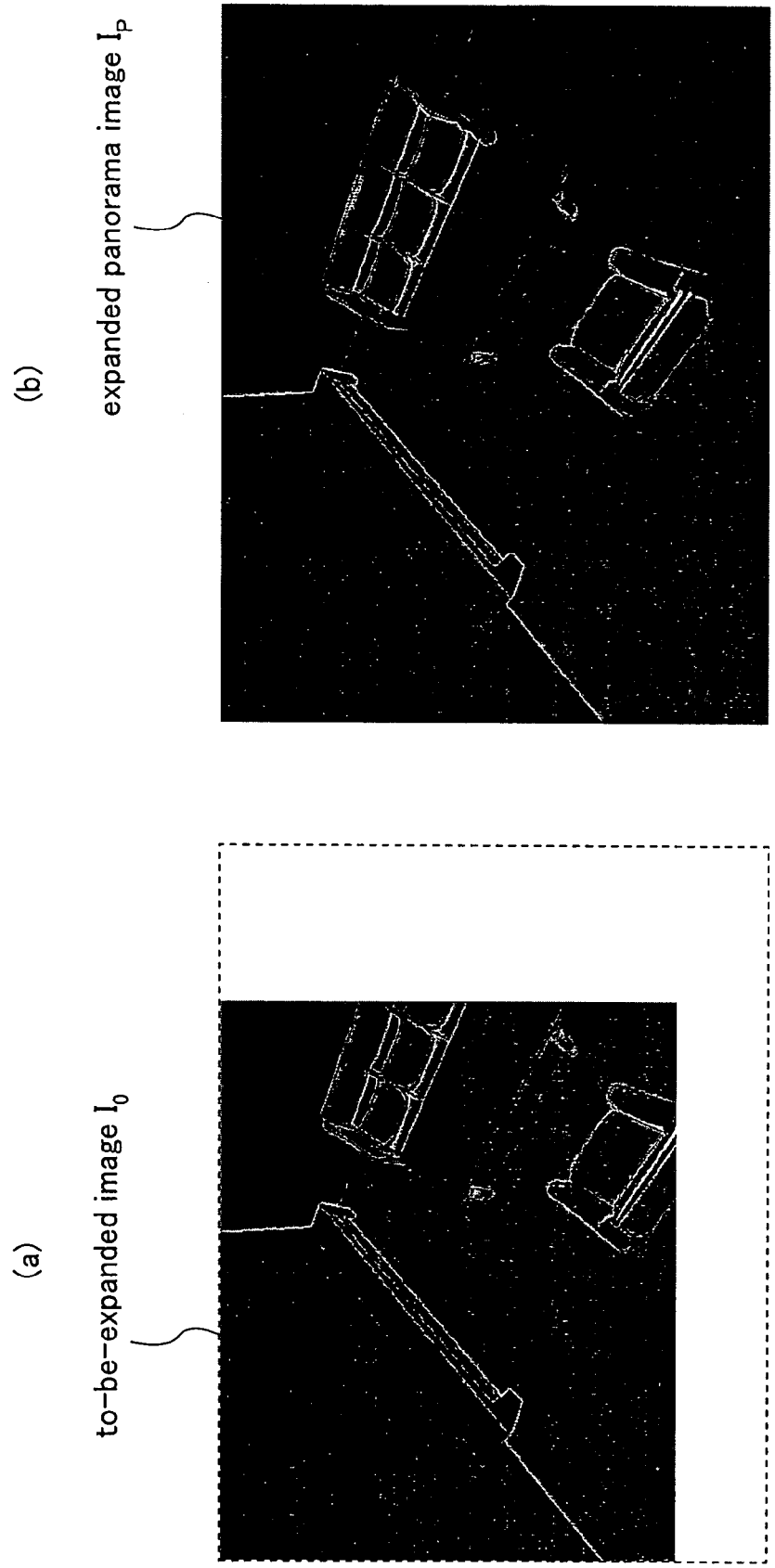
FIG. 16 is an example of a panorama image.

FIG. 16 is a panorama image synthesized by the method explained with reference to FIG. 15, wherein FIG. 16(a) shows a to-be-expanded image $I_0$ and FIG. 16(b) shows a panorama image $I_P$ generated according to the present embodiment. As can be understood from FIG. 16(b), the panorama image is excellent with no intensity error.

FIG. 17 lists results of comparison between Embodiment 1 and the present embodiment. FIG. 17 indicates mean square errors of intensity and error variances of panorama images synthesized according to the respective embodiments with references to a correct image as a criterion. It is understood from FIG. 17 that the panorama image generated according to the present embodiment includes less error and exhibits less error variance than the panorama image generated according to Embodiment 1. This indicates effectiveness of the panorama image synthesis method according to Embodiment 3.

In the step S32, plural coefficient sets of which evaluation value e_val is high in each A region are held and a combination of coefficient sets of which evaluation value e is the highest in the held coefficient sets is calculated as the most suitable linearization coefficients. However, as another method for calculating the most suitable linearization coefficients may be possible: namely, instead of calculation and holding of plural linearization coefficient sets in each A region, three points (pixel values) in each A region are selected simultaneously for linearization coefficient calculation, evaluation of the calculated linearization coefficients is performed using (Expression 8), and a combination of the coefficient sets of which evaluation values are the higher reaches is selected through the repetition of the calculation and the evaluation.

Alternatively, as another calculation method for the most suitable linearization coefficients in the step S32, for example, linearization coefficients may be obtained so that a square error between the pixel value calculated using the linearization coefficient calculated in each region by (Expression 4) to (Expression 6) and the pixel value of the original to-be-expanded image is the smallest. Specifically, for example, a coefficient set that minimizes an error function E indicated in (Expression 12) may be obtained by the gradient method using the linearization coefficient of which evaluation is the highest of all the evaluations obtained in each A region as the initial value of the linearization coefficient (in detail, see "Numeral Recipes in C Japanese Edition," Gijutsu-Hyoron Co., Ltd., pp. 292-295, 1993). The square error function is expressed in (Expression 13), wherein $I_a^b$ indicates a pixel value at a k-th pixel position in an image $I_a$, and l, m, and n are the numbers of pixels in the respective A regions.

$$E = \sum_{k=0}^{l} \left\{ [i_1^k] - [c_1^4 \ c_1^5 \ c_1^6] \begin{bmatrix} i_4^k \\ i_5^k \\ i_6^k \end{bmatrix} \right\}^2 + \quad \text{(Expression 13)}$$

$$\sum_{k=0}^{m} \left\{ \begin{bmatrix} i_4^k \\ i_5^k \\ i_6^k \end{bmatrix} - \begin{bmatrix} c_4^7 & c_4^8 & c_4^9 \\ c_5^7 & c_5^8 & c_5^9 \\ c_6^7 & c_6^8 & c_6^9 \end{bmatrix} \begin{bmatrix} i_7^k \\ i_8^k \\ i_9^k \end{bmatrix} \right\}^2 +$$

$$\sum_{k=0}^{n} \left\{ \begin{bmatrix} i_1^k \\ i_2^k \\ i_3^k \end{bmatrix} - [c_1^4 \ c_1^5 \ c_1^6] \begin{bmatrix} c_7^4 & c_7^5 & c_7^6 \\ c_8^4 & c_8^5 & c_8^6 \\ c_9^4 & c_9^5 & c_9^6 \end{bmatrix} \begin{bmatrix} i_7^k \\ i_8^k \\ i_9^k \end{bmatrix} \right\}^2$$

Figure 18:
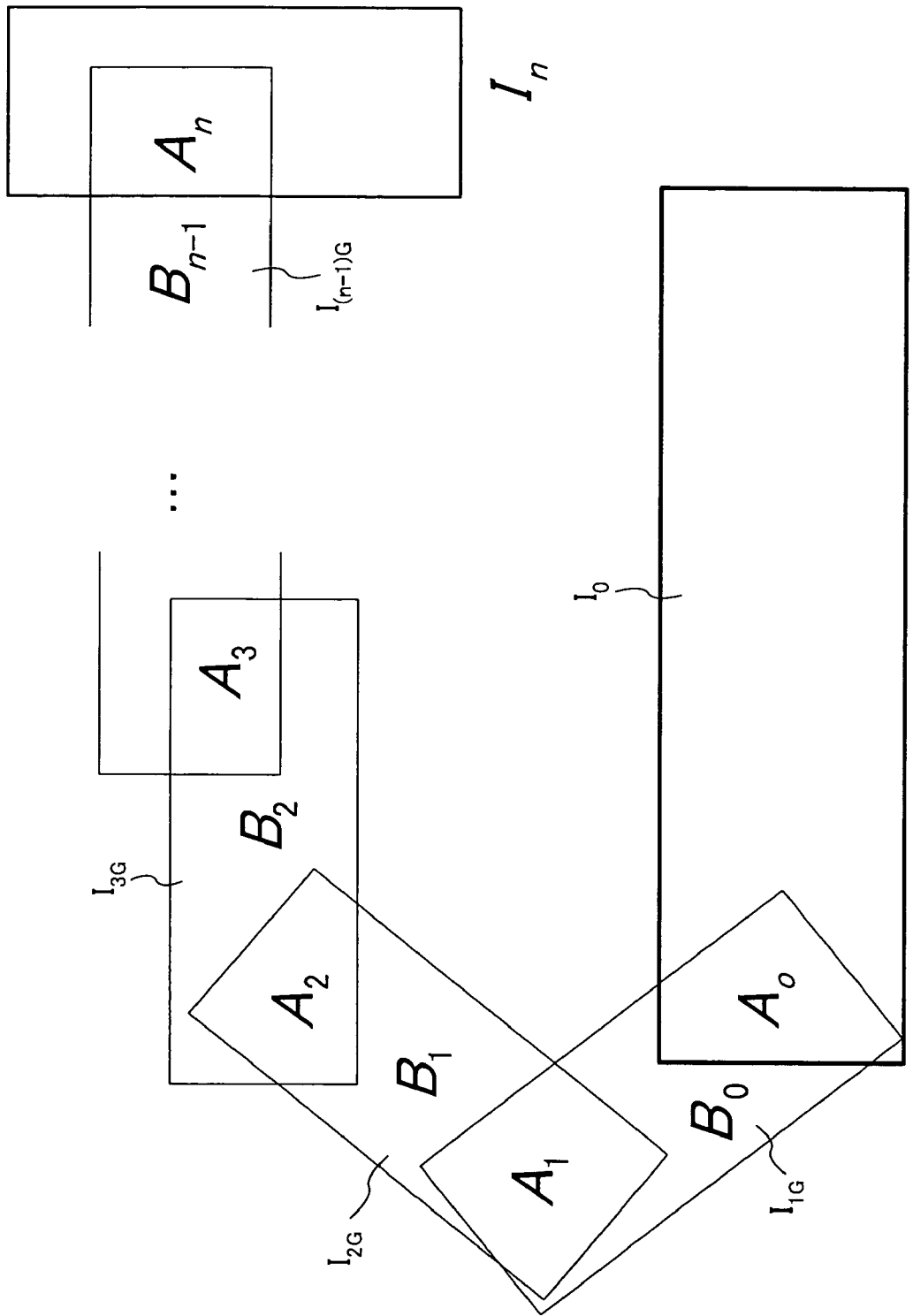
FIG. 18 is a diagram of one example of the evaluation image group.

Up to this, the case is described where an image of which light source environment is the same as that in the original to-be-expanded image is the to-be-expanded image itself in the evaluation image group. However, it is noted that in the evaluation image group, an image of which light source environment is the same as that in the to-be-expanded image $I_0$ may be an image $I_n$ different from $I_0$ in general, as shown in FIG. 18. In this case, the process flow in the step S31 of judging the presence or the absence of the evaluation image group is slightly different from the flow of FIG. 14.

Figure 19:
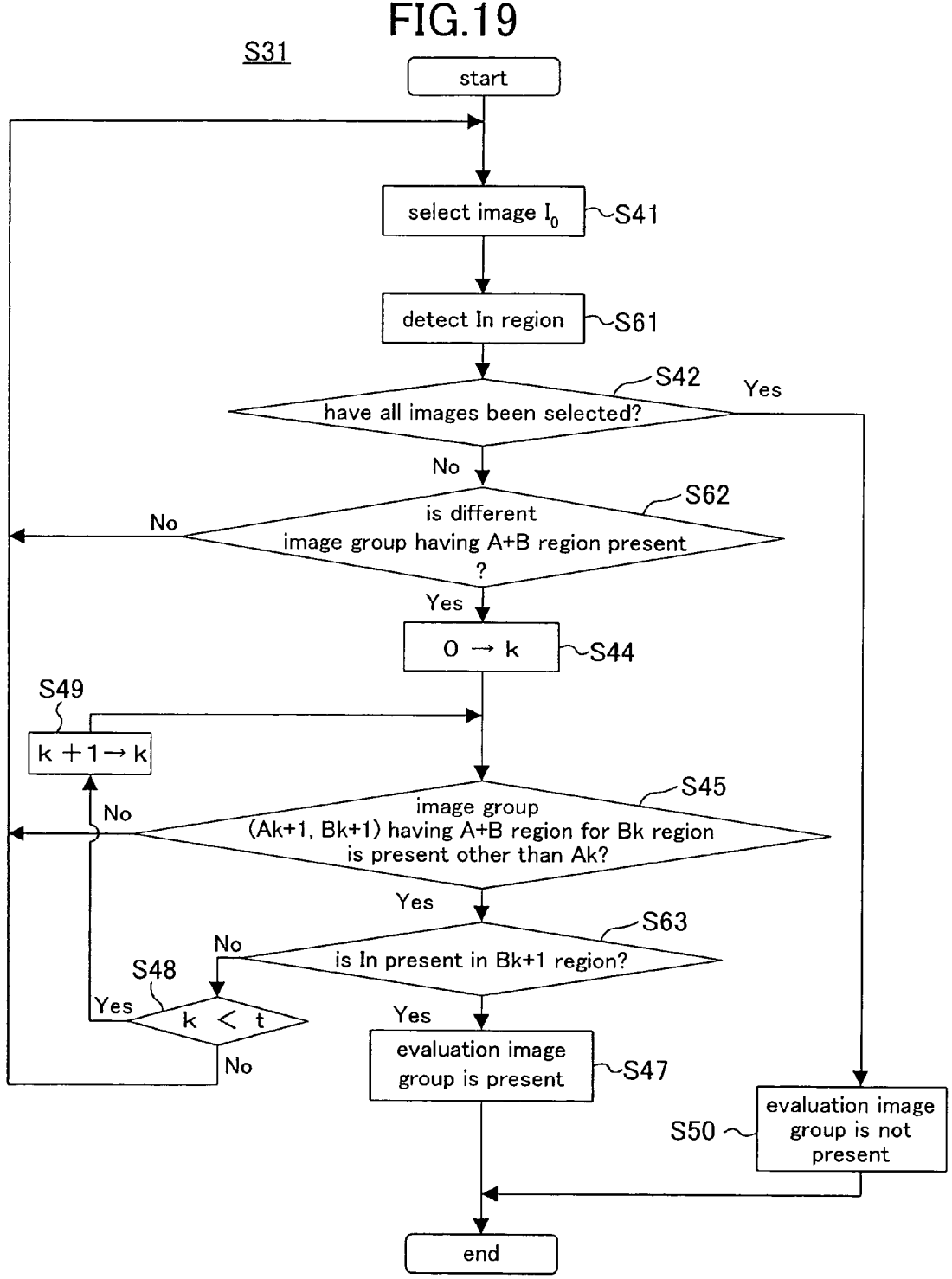
FIG. 19 is a flowchart depicting processing of judging the evaluation image group.

FIG. 19 is a flowchart depicting the processing of the step S31 in the case where an image of which light source environment is the same as that in the to-be-expanded image $I_0$ is an image $I_n$ different from the to-be-expanded image $I_0$. In FIG. 19, the same reference numerals as in FIG. 14 are allotted to the same steps as in FIG. 14 and the detailed description thereof is omitted here. Different from FIG. 14, the image $I_n$ of which light source environment is the same as that in the to-be-expanded image $I_0$ is detected (at least one image is present necessarily because the images under detection includes the image $I_0$).

First, in the step S41, one arbitrary image $I_0$ is selected from the images stored in the image storage section 103.

Next, in a step S61, the image $I_n$ of which light source environment is the same as that in the image $I_0$ selected in the step S41 is detected. As a specific detection method, for example, it is possible that an object to be measured is placed in a to-be-measured region and variation thereof is checked. In this method, the object may be made of barium sulfate or Spectralon which cause perfectly diffuse reflection and causes no mirror reflection.

Further, it is thought that the light source environment varies as time goes by, and therefore, it may be judged that optical environment varies in every given time period. This is especially effective under environment where sunlight enters through a window, for example.

Also, it is possible that the light source state is shot using a mirror sphere and variation thereof is detected. The light source state may be shot, of course, while a wide-angle camera is directed upward to the ceiling.

Alternatively, it is possible that the position of the pixel of which intensity is the highest is recognized in the shot region and it is judged that the light source environment varies when the position shifts. This is to detect variation in the light source position by detecting the position shift based on a concept that the pixel of which intensity is the highest causes mirror reflection.

Next, in the step S42, whether all the images stored in the image storage section 103 in the step S41 are selected or not is judged. When the judgment result is that all the images have been already selected (Yes in S42), it is judged that there is no evaluation image group (S50).

When it is judged that not all images have been selected otherwise (No in S42), judgment is performed in a step S62 as to whether at least one image group having the A+B region for the image $I_0$ selected in the step S41 is present or not. When the judgment result is that no image group is present (No in S62), the routine returns to the step S41 to perform reselection of an image $I_0$. When at least one image group is present otherwise (Yes in step S62), 0 is assigned to k in the step S44.

Subsequently, in the step S45, one image group ($A_k$, $B_k$) is selected from the image groups judged in the step S62 and whether at least one another image group ($A_{k+1}$, $B_{k+1}$) having the A+B region in the $B_k$ region is present or not among in the selected image groups is judged. When it is judged that there is no new image group (No in S45), the routine returns to the step S41 to perform image reselection.

When the new image group ($A_{k+1}$, $B_{k+1}$) is present (Yes in S45), whether an overlap region ($A_n$) that overlaps the image $I_n$ in the $B_{k+1}$ region is present or not is judged in a step S63. When it is present (Yes in S63), it is judged that the evaluation image is present, terminating the processing.

When there is no overlap region with the image $I_n$ in the $B_{k+1}$ region (No in S63), whether k is smaller than the threshold value t or not is judged (step S48). When k is smaller than a threshold value t (Yes in S48), k is incremented (step S49) and the routine returns to the step S45 to repeat the processing. When k is not smaller than the threshold value t otherwise (No in S48), the routine returns to the step S41 to reselect an image $I_0$.

As described above, even in the case where an image of which light source environment is the same as that in the to-be-expanded image $I_0$ is different from the to-be-expanded image $I_0$, the presence or the absence of the evaluation image group can be judged by the processing shown in FIG. 19.

According to the present embodiment, a linearization coefficient that minimizes accumulation of errors caused by the repetitive calculation in the image synthesis can be calculated through the step S31 of judging whether the evaluation image group is present or not and the step S32 of calculating a liner coefficient with less error in the case where the evaluation image group is present, enabling panorama image synthesis with further less intensity error to enhance the accuracy of object detection.

INDUSTRIAL APPLICABILITY

The present invention attains panorama image synthesis of which light source environment is uniform and attains object detection from an image shot under arbitrary light source environment by using a plurality of thus synthesized panorama images. Hence, it is useful in intruder detection and the like in monitoring systems to be used in places where light source environment frequently varies such as outdoors.

What is claimed is:

1. A panorama image synthesis method comprising the steps of:
   obtaining an overlap image group of images each including a first overlap region in common, the images being composed of
      N images (N is an integer larger than 2) each including a second overlap regions other than the first overlap region, and
      a to-be-expanded image not including the second overlap region;
   calculating a linearization coefficient of the to-be-expanded image by a panorama image synthesis means, using pixel values of the images of the overlap image group in the first overlap region, the linearization coefficient being a coefficient for expressing the to-be-expanded image by a linear combination of the N images; and
   expanding in size the to-be-expanded image up to the second overlap region, using the linearization coefficient and pixel values of the N images in the second overlap region,
   wherein a panorama image is synthesized based on the to-be-expanded image of which size is expanded.

2. The panorama image synthesis method of claim 1, wherein images different from one another in light source environment are obtained as the N images.

3. The panorama image synthesis method of claim 1, further comprising the step of:
   judging reliability of the calculated linearization coefficient of the to-be-expanded image,
   wherein when it is judged that the reliability is low, an overlap image group is obtained again.

4. The panorama image synthesis method of claim 1, wherein
   in the overlap image group obtaining step, an overlap image group is selected from images stored in an image storage section, and
   when a new image is input to the image storage section, reselection of an overlap image group is performed, suitability for image synthesis is compared between the newly selected overlap image group and a former overlap image group, and whether the panorama image is to be updated or not is judged based on the comparison result.

5. The panorama image synthesis method of claim 4, wherein
   the suitability for image synthesis is judged based on a number of diffuse reflection pixels, and
   the panorama image is updated when the newly selected overlap image group includes a larger number of diffuse reflection pixels than the former overlap image group.

6. The panorama image synthesis method of claim 4, wherein
   the suitability for image synthesis is judged based on inter-image independency, and
   the panorama image is updated when the newly selected overlap image group has higher inter-image independency than the former overlap image group.

7. An object detection method comprising the steps of:
   generating a plurality of panorama images each including a shot range of an image under detection by the panorama image synthesis method of claim 1;
   generating a predicted background image of which light source environment is the same as that of the image under detection based on the image under detection and the plurality of panorama images; and
   performing object detection by comparing the image under detection and the predicted background image.

8. The object detection method of claim 7, wherein a number of the plurality of panorama images is at least three.

9. The panorama image synthesis method of claim 1, wherein
   in the overlap image group obtaining step, when a plurality of overlap image groups each having the same first overlap region are present, reliability of calculated linearization coefficients of the respective overlap image groups are evaluated to select a group with highest reliability.

10. The panorama image synthesis method of claim 1, further comprising the step of:
    judging whether an evaluation image group is present or not for the to-be-extended image,
    wherein when an evaluation image group is present, the linearization coefficient of the to-be-expanded image is calculated using the evaluation image group.

11. The panorama image synthesis method of claim 10, wherein
    when a plurality of evaluation image groups are present, an evaluation image group having highest image independency in the second overlap region included in the evaluation image group is selected.

12. The panorama image synthesis method of claim 10, wherein
    when a plurality of evaluation image groups are present, an evaluation image group which occupies an image region with a largest number of pixels is selected.

13. A panorama image synthesis system comprising:
    means for obtaining an overlap image group of images including a first overlap region in common, the images being composed of N images (N is an integer larger than 2) including a second overlap region other than the first overlap region and a to-be-expanded image not including the second overlap region;
    means for calculating a linearization coefficient of the to-be-expanded image using pixel values of the image of the overlap image group in the first overlap region, the linearization coefficient being a coefficient for expressing the to-be-expanded image by a linear combination of the N images; and
    means for expanding in size the to-be-expanded image up to the second overlap region, using the linearization coefficient and pixel values of the N images in the second overlap region,
    wherein a panorama image is synthesized based on the to-be-expanded image of which size is expanded.

14. An image shooting apparatus comprising:

an image shooting section;

a shot image correction section that performs geometric correction and optical correction to an image shot by the image shooting section;

an image storage section that stores images corrected by the shot image correction section; and the panorama image synthesis system of claim 13 that receives an image stored in the image storage section as an input, wherein the panorama synthesis system obtains the overlap image group from the images stored in the image storage system.

15. An object detection system comprising:

the image shooting apparatus of claim 14;

an object detection section that performs object detection using a panorama image synthesized by the panorama image synthesis system included by the image shooting apparatus; and a detected object display section that displays a region of an object detected by the object detection section.

16. A panorama image synthesis program embedded as computer instructions in a computer readable medium that allows a computer to execute panorama image synthesis, comprising the steps of:

obtaining an overlap image group of images including a first overlap region in common, the images being composed of N images (N IS an integer larger than 2) including a second overlap region other than the first overlap region and a to-be-expanded image not including the second overlap region;

calculating a linearization coefficient of the to-be-expanded image, using pixel values of the images of the overlap image group in the first overlap region, the linearization coefficient being a coefficient for expressing the to-be-expanded image by a linear combination of the N images;

expanding in size the to-be-expanded image up to the second overlap region, using the linearization coefficient and pixel values of the N images in the second overlap region; and synthesizing a panorama image based on the to-be-expanded image of which size is expanded.

* * * * *

UNITED STATES PATENT AND TRADEMARK OFFICE
CERTIFICATE OF CORRECTION

PATENT NO. : 7,535,499 B2
APPLICATION NO. : 11/132654
DATED : May 19, 2009
INVENTOR(S) : Kazutoyo Takata et al.

It is certified that error appears in the above-identified patent and that said Letters Patent is hereby corrected as shown below:

On the title page, the Notice mistakenly indicates that this patent is subject to a terminal disclaimer. This patent is not subject to any terminal disclaimer.
Delete this patent is subject to a terminal disclaimer.

Signed and Sealed this

First Day of September, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,535,499 B2 | Page 1 of 1 |
| APPLICATION NO. | : 11/132654 | |
| DATED | : May 19, 2009 | |
| INVENTOR(S) | : Takata et al. | |

It is certified that error appears in the above-identified patent and that said Letters Patent is hereby corrected as shown below:

On the Title page,

[*] Notice:   Subject to any disclaimer, the term of this patent is extended or adjusted under 35 USC 154(b) by 576 days.

Delete the phrase "by 576 days" and insert -- by 924 days --

Signed and Sealed this

Eighteenth Day of May, 2010

David J. Kappos
*Director of the United States Patent and Trademark Office*